US011606236B2

(12) United States Patent
Ibrahim et al.

(10) Patent No.: US 11,606,236 B2
(45) Date of Patent: Mar. 14, 2023

(54) FULL-DUPLEX COMMUNICATIONS

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US); Wanshi Chen, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 49 days.

(21) Appl. No.: 17/382,127

(22) Filed: Jul. 21, 2021

(65) Prior Publication Data

US 2023/0051034 A1 Feb. 16, 2023

(51) Int. Cl.
*H04L 5/14* (2006.01)
*H04L 27/26* (2006.01)
*H04W 80/02* (2009.01)
*H04W 56/00* (2009.01)

(52) U.S. Cl.
CPC ............ *H04L 27/2607* (2013.01); *H04L 5/14* (2013.01); *H04W 56/005* (2013.01); *H04W 80/02* (2013.01)

(58) Field of Classification Search
CPC .......... H04L 27/2607; H04L 27/2678; H04W 56/003; H04W 56/005; H04W 72/042; H04W 72/121; H04W 72/1268
See application file for complete search history.

(56) References Cited

U.S. PATENT DOCUMENTS 10,863,530 B2 * 12/2020 Lim .................. H04W 72/1226
2018/0097679 A1 * 4/2018 Zhang ................. H04W 72/121

* cited by examiner

*Primary Examiner* — Mansour Oveissi
(74) *Attorney, Agent, or Firm* — Shumaker & Sieffert, P.A.

(57) ABSTRACT

Certain aspects of the present disclosure provide techniques for time aligning full-duplex communications. A method that may be performed by a base station (BS) includes transmitting, to a first user equipment (UE): an indication of a first uplink timing advance (TA) determined based on a first propagation delay between the BS and the first UE, and an indication of a first cyclic prefix (CP) length determined based on the first uplink TA. In certain aspect, the method also includes transmitting, to the first UE, a first downlink communication comprising a downlink CP, during a first time window comprising a plurality of time periods.

30 Claims, 13 Drawing Sheets

FULL-DUPLEX COMMUNICATIONS

BACKGROUND

Field of the Disclosure

Aspects of the present disclosure relate to wireless communications, and more particularly, to techniques for time aligned transmissions in a full-duplex communication.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes.

Certain aspects of the disclosure are directed to a method for full-duplex mode wireless communication by a base station (BS). In certain aspects, the method includes transmitting, to a first user equipment (UE): an indication of a first uplink timing advance (TA) determined based on a first propagation delay between the BS and the first UE, and an indication of a first cyclic prefix (CP) length determined based on the first uplink TA. In certain aspects, the method includes transmitting, to the first UE, a first downlink communication comprising a downlink CP, during a first time window comprising a plurality of time periods. In certain aspects, the method includes receiving, from the first UE, a first uplink communication during the first time window, wherein the first uplink communication comprises a first uplink CP having the first CP length, and wherein the first uplink CP and the downlink CP at least partially overlap in time from, a perspective of the BS.

Certain aspects of the disclosure are directed to a method for full-duplex mode wireless communication by a user equipment (UE). In certain aspects, the method includes receiving, from a base station (BS): an indication of a first uplink timing advance (TA), and an indication of a first cyclic prefix (CP) length determined based on the first uplink TA. In certain aspects, the method includes transmitting, to the BS, a first uplink communication during a first time window comprising a plurality of time periods, wherein the first uplink communication comprises a first uplink CP having the first CP length. In certain aspects, the method includes receiving, from the BS, a first downlink communication comprising a downlink CP during the first time window, wherein the first uplink CP and the downlink CP at least partially overlap in time from a perspective of the UE.

Certain aspects of the disclosure are directed to a base station (BS) configured for full-duplex communication. In certain aspects, the BS includes a memory, and a processor coupled to the memory. The memory and the processor may be configured to transmit, to a first user equipment (UE): an indication of a first uplink timing advance (TA) determined based on a first propagation delay between the BS and the first UE, and an indication of a first cyclic prefix (CP) length determined based on the first uplink TA. The memory and the processor may be configured to transmit, to the first UE, a first downlink communication comprising a downlink CP, during a first time window comprising a plurality of time periods. The memory and the processor may be configured to receive, from the first UE, a first uplink communication during the first time window, wherein the first uplink communication comprises a first uplink CP having the first CP length, and wherein the first uplink CP and the downlink CP at least partially overlap in time from, a perspective of the BS.

Certain aspects of the disclosure are directed to a user equipment (UE) configured for full-duplex communication. In certain aspects, the UE includes a memory, and a processor coupled to the memory. The memory and the processor may be configured to receive, from a base station (BS): an indication of a first uplink timing advance (TA), and an indication of a first cyclic prefix (CP) length determined based on the first uplink TA. The memory and the processor may be configured to transmit, to the BS, a first uplink communication during a first time window comprising a plurality of time periods, wherein the first uplink communication comprises a first uplink CP having the first CP length. The memory and the processor may be configured to receive, from the BS, a first downlink communication comprising a downlink CP during the first time window, wherein the first uplink CP and the downlink CP at least partially overlap in time from a perspective of the UE.

Certain aspects of the disclosure are directed to a base station (BS) for full-duplex mode wireless communication. In certain aspects, the BS includes means for transmitting, to a first user equipment (UE): an indication of a first uplink timing advance (TA) determined based on a first propagation delay between the BS and the first UE, and an indication of a first cyclic prefix (CP) length determined based on the first uplink TA. In certain aspects, the BS includes means for transmitting, to the first UE, a first downlink communication comprising a downlink CP, during a first time window comprising a plurality of time periods. In certain aspects, the BS includes means for receiving, from the first UE, a first uplink communication during the first time window, wherein the first uplink communication comprises a first uplink CP having the first CP length, and wherein the first uplink CP and the downlink CP at least partially overlap in time from, a perspective of the BS.

Certain aspects of the disclosure are directed to a user equipment (UE) for full-duplex mode wireless communication. In certain aspects, the UE includes means for receiving, from a base station (BS): an indication of a first uplink timing advance (TA), and an indication of a first cyclic prefix (CP) length determined based on the first uplink TA. In certain aspects, the UE includes means for transmitting, to the BS, a first uplink communication during a first time window comprising a plurality of time periods, wherein the first uplink communication comprises a first uplink CP having the first CP length. In certain aspects, the BS includes means for receiving, from the BS, a first downlink communication comprising a downlink CP during the first time window, wherein the first uplink CP and the downlink CP at least partially overlap in time from a perspective of the UE.

Certain aspects of the disclosure are directed to a non-transitory computer-readable medium having instructions stored thereon that, when executed by a base station (BS), cause the BS to perform operations for full-duplex communication. In certain aspects, the operations include transmitting, to a first user equipment (UE): an indication of a first uplink timing advance (TA) determined based on a first propagation delay between the BS and the first UE, and an indication of a first cyclic prefix (CP) length determined based on the first uplink TA. In certain aspects, the operations include transmitting, to the first UE, a first downlink communication comprising a downlink CP, during a first time window comprising a plurality of time periods. In certain aspects, the operations include receiving, from the first UE, a first uplink communication during the first time window, wherein the first uplink communication comprises a first uplink CP having the first CP length, and wherein the first uplink CP and the downlink CP at least partially overlap in time from, a perspective of the BS.

Certain aspects of the disclosure are directed to a non-transitory computer-readable medium having instructions stored thereon that, when executed by a user equipment (UE), cause the UE to perform operations for full-duplex communication. In certain aspects, the operations include receiving, from a base station (BS): an indication of a first uplink timing advance (TA), and an indication of a first cyclic prefix (CP) length determined based on the first uplink TA. In certain aspects, the operations include transmitting, to the BS, a first uplink communication during a first time window comprising a plurality of time periods, wherein the first uplink communication comprises a first uplink CP having the first CP length. In certain aspects, the operations include receiving, from the BS, a first downlink communication comprising a downlink CP during the first time window, wherein the first uplink CP and the downlink CP at least partially overlap in time from a perspective of the UE.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
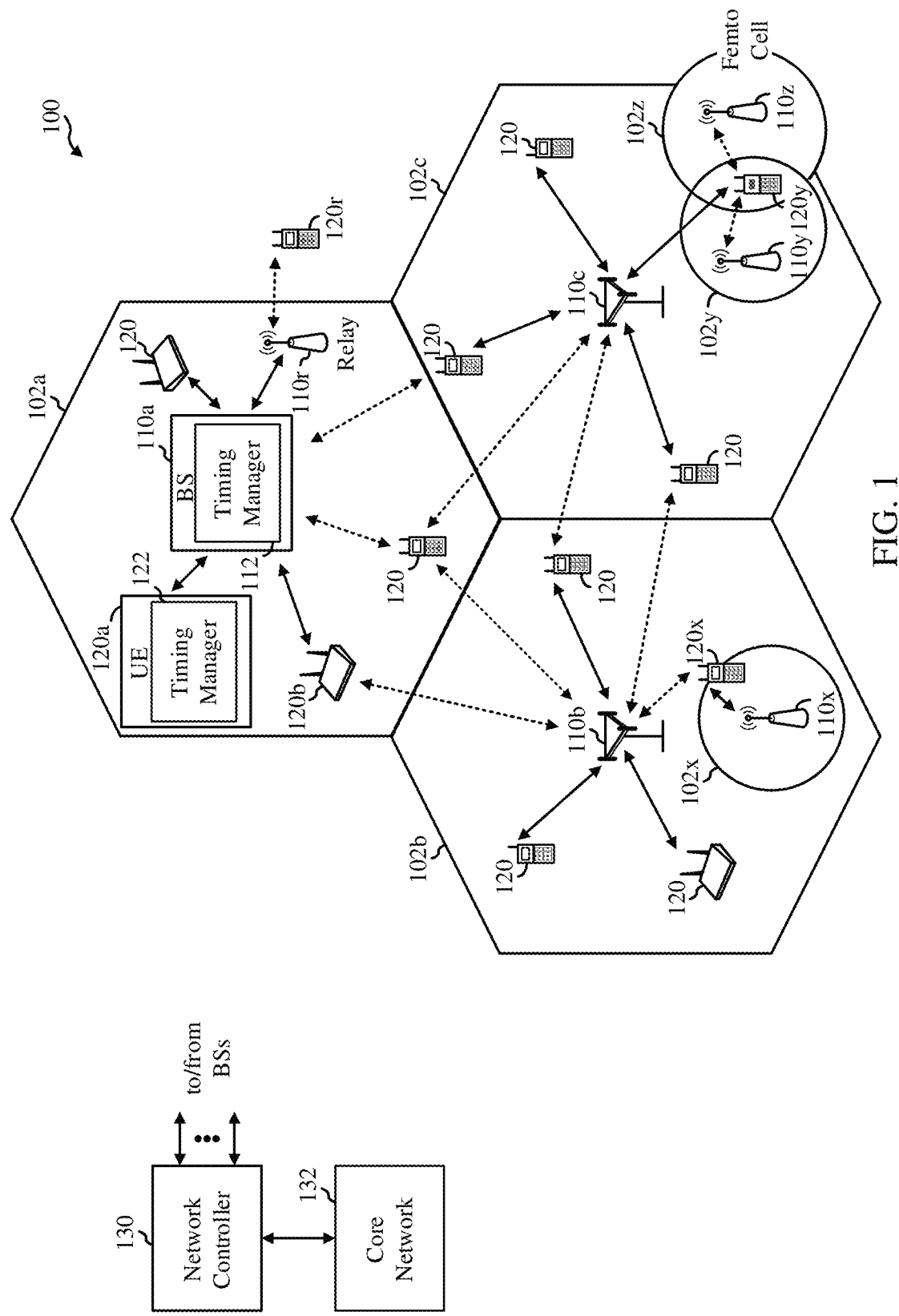
FIG. 1 is a block diagram conceptually illustrating an example wireless communication network, in accordance with certain aspects of the present disclosure.

Aspects of the present disclosure provide apparatus, methods, processing systems, and computer readable mediums for timing alignment of uplink and downlink transmissions in full-duplex (FD) communications. For example, certain aspects discussed herein are for full-duplex communication by a user equipment (UE). FD communication generally refers to a particular device (e.g., UE) both transmitting and receiving at the same time, as compared to half-duplex (HD) communication where a particular device only one of transmits or receives at a given time.

Within cellular communication networks, wireless communications may occur between user equipment (UEs) and base stations (BSs). In FD communications, time alignment between uplink and downlink communication periods (e.g., symbols) at a UE and BS may reduce or eliminate interference, such as intra-cellular interference at the BS, self-interference at the UE, etc. However, such as due to mobility of the UEs and/or geographic distances, the UEs and BSs may experience propagation delays that affect the timing at which a downlink signal transmitted by the BS is received by the UE, and the timing at which an uplink signal transmitted by the UE is received by the BS. For example, if the distance between the UE and BS is large, the propagation delay may cause misalignment of uplink and downlink communications. For example, if the UE transmits an uplink communication at a time X, and the BS also transmits a downlink communication at the time X, the UE may receive the downlink communication from the BS at the time X+delay, wherein the delay is due to the propagation delay. Further, the BS may receive the uplink communication at a time X+delay2, wherein the delay is due to the propagation delay. Accordingly, though both the uplink communication and downlink communication are transmitted at the same time X by the UE and BS, respectively, the reception of the uplink communication is misaligned with the transmission of the downlink communication at the BS, and the reception of the downlink communication is misaligned with the transmission of the uplink communication at the UE.

Such misalignment may result in increased interference at a device. In particular, the uplink and downlink communication may each include a cyclic prefix (CP). If the CPs of the uplink and downlink communication overlap in time at a particular device (e.g., UE or BS), the device may be able to perform interference cancellation to deal with the effects of any interference between the uplink communication and the downlink communication. However, if the CPs of the uplink and downlink communication do not overlap in time at the device, there may be interference between the communications. Accordingly, certain techniques discussed herein provide for timing alignment of uplink and downlink communications at devices where at least the CPs of the uplink and downlink communications overlap in time at a device, such as to allow for interference cancellation at the device. Such timing alignment may increase reliability of communications, including reducing the need for performing re-transmissions, thereby improving throughput over the network.

The following description provides example methods for time aligning uplink and downlink communications in an FD communication. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

According to certain aspects, the BSs 110 and UEs 120 may be configured for timing alignment of communications made in full duplex communication. As shown in FIG. 1, the BS 110a includes a timing manager 112 configured to transmit, to the UE 120a, an indication of a first uplink timing advance (TA) determined based on a first propagation delay between the BS 110a and the UE 120a, and an indication of a first cyclic prefix (CP) length determined based on the first uplink TA, according to aspects described herein. The timing manager 112 is also configured to transmit, to the UE 120a, a first downlink communication comprising a downlink CP, during a first time window comprising a plurality of time periods. The timing manager 112 is also configured to receive, from the UE 120a, a first uplink communication during the first time window, wherein the first uplink communication comprises a first uplink CP having the first CP length, and wherein the first uplink CP and the downlink CP at least partially overlap in time from, a perspective of the BS 110a.

The UE 120a includes a timing manager 122 configured to receive, from the BS 110a: an indication of a first uplink timing advance (TA), and an indication of a first cyclic prefix (CP) length determined based on the first uplink TA, according to aspects described herein. The timing manager 122 is also configured to transmit, to the BS 110a, a first uplink communication during a first time window comprising a plurality of time periods, wherein the first uplink communication comprises a first uplink CP having the first CP length. The timing manager 122 is also configured to receive, from the BS 110a, a first downlink communication comprising a downlink CP during the first time window, wherein the first uplink CP and the downlink CP at least partially overlap in time from a perspective of the UE 120a.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G core network (5GC)), which provides various network functions such as access and mobility management, session management, user plane function, policy control function, authentication server function, unified data management, application function, network exposure function, network repository function, network slice selection function, etc.

In some examples, the wireless communication network 100 may support timing advance for UEs 120 in communication with their respective BS 110. Generally, each BS 110 can support simultaneous communication with multiple UEs 120 within a respective cell 102. For example, a BS 110a and a UE 120a may communicate with each other on downlink and uplink communication links. To achieve proper timing for transmission and reception between the BS 110a and the UE 120a, timing advance information may be distributed from the BS 110a to UE 120a to allow the UE 120a to account for propagation delay and/or delay due to other factors (e.g., repeaters and/or relays 110r). Timing advance information can help ensure synchronized reception timing of uplink transmissions from multiple UEs.

Figure 2:
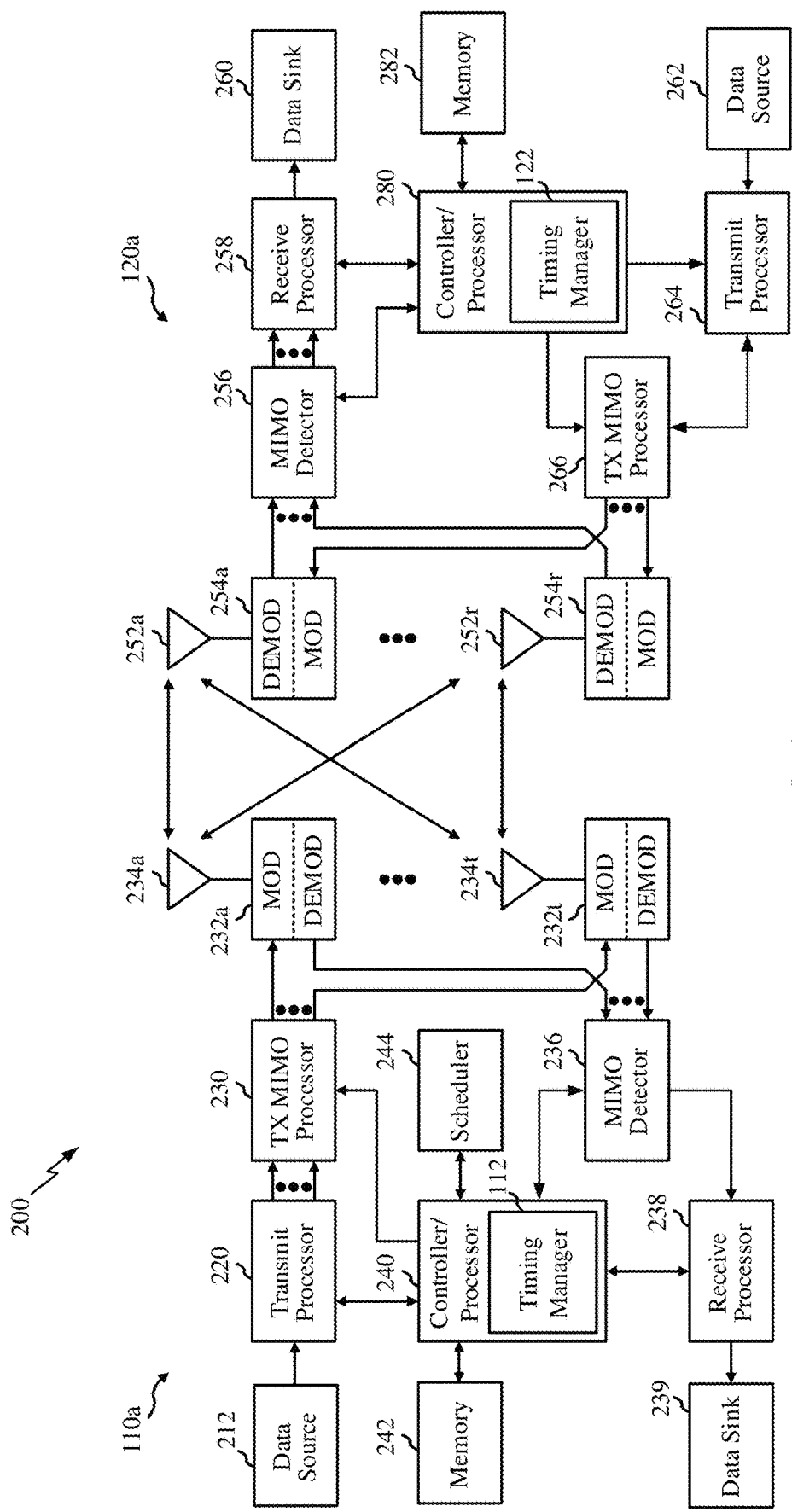
FIG. 2 is a block diagram conceptually illustrating a design of an example base station (BS) and user equipment (UE), in accordance with certain aspects of the present disclosure.

FIG. 2 illustrates example components 200 of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254a-254r (e.g., for SC-FDM, etc.), and transmitted to the BS 110a. At the BS 110a, the uplink signals from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a timing manager 112 configured to transmit, to the UE 120a, an indication of a first uplink timing advance (TA) determined based on a first propagation delay between the BS 110a and the UE 120a, and an indication of a first cyclic prefix (CP) length determined based on the first uplink TA, according to aspects described herein. The timing manager 112 is also configured to transmit, to the UE 120a, a first downlink communication comprising a downlink CP, during a first time window comprising a plurality of time periods. The timing manager 112 is also configured to receive, from the UE 120a, a first uplink communication during the first time window, wherein the first uplink communication comprises a first uplink CP having the first CP length, and wherein the first uplink CP and the downlink CP at least partially overlap in time from, a perspective of the BS 110a. Although shown at the controller/processor 240, other components of the BS 110a may be used to perform the operations described herein.

As shown in FIG. 2, the controller/processor 280 of the UE 120a has a timing manager 122 configured to receive, from the BS 110a: an indication of a first uplink timing advance (TA), and an indication of a first cyclic prefix (CP) length determined based on the first uplink TA, according to aspects described herein. The timing manager 122 is also configured to transmit, to the BS 110a, a first uplink communication during a first time window comprising a plurality of time periods, wherein the first uplink communication comprises a first uplink CP having the first CP length. The timing manager 122 is also configured to receive, from the BS 110a, a first downlink communication comprising a downlink CP during the first time window, wherein the first uplink CP and the downlink CP at least partially overlap in time from a perspective of the UE 120a. Although shown at the controller/processor 280, other components of the UE 120a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
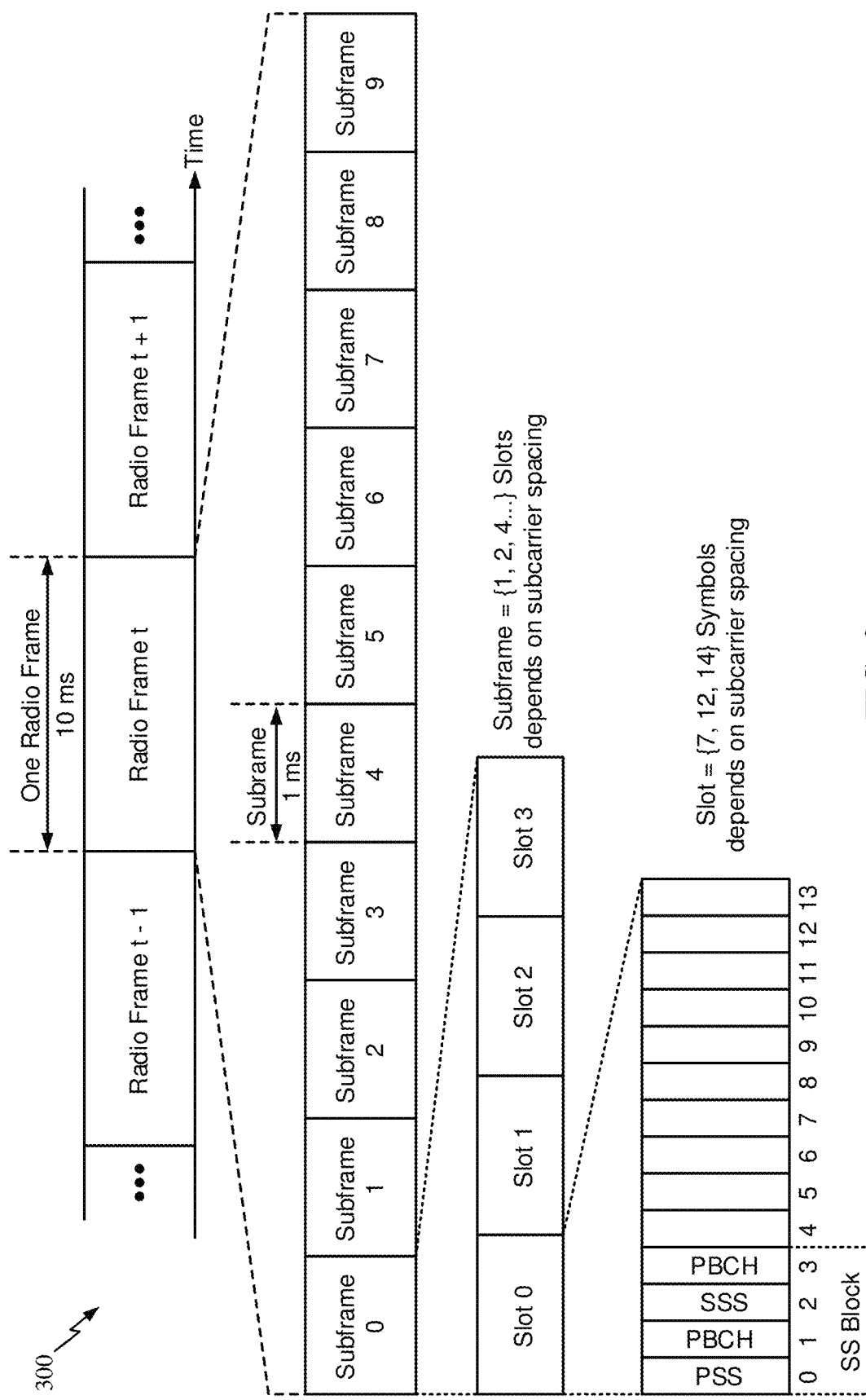
FIG. 3 is an example frame format for certain wireless communication systems, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Full-Duplex (FD) Communication

The transmissions in a wireless communication network 100 may utilize one or more types of duplexing, such as FD or HD. For example, network 100 may use one or more of in-band full-duplex (IBFD) or subband frequency-division duplex ((FDD), also known as subband full duplex (SBFD)), which are types of FD.

Figure 4A:
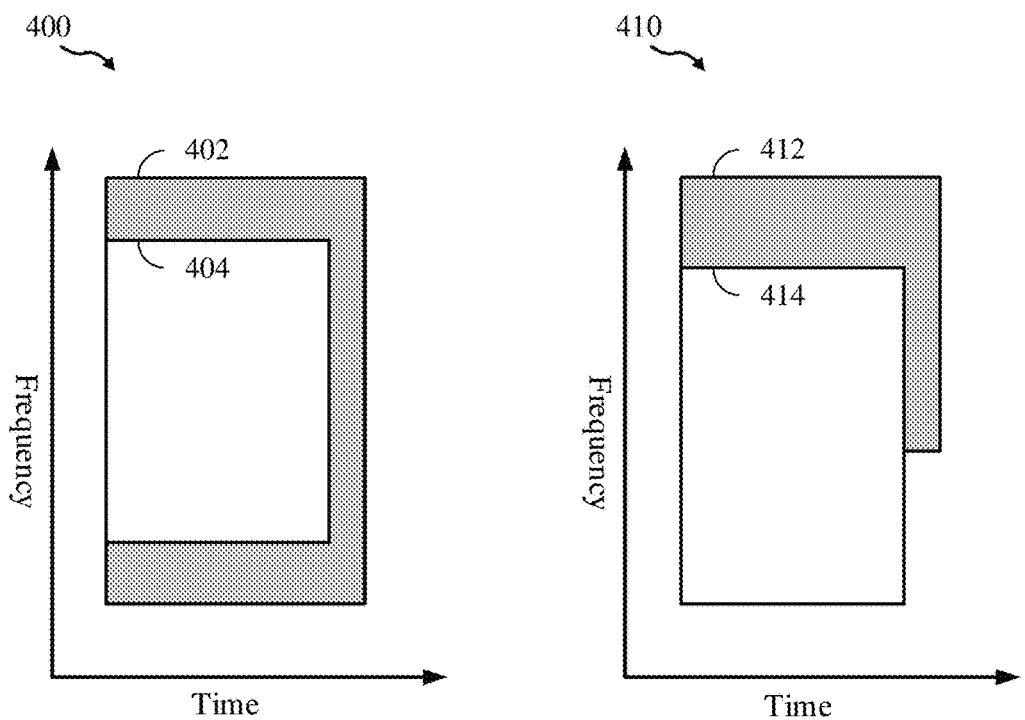
FIG. 4A is a block diagram illustrating two examples of in-band full duplex (IBFD), in accordance with aspects disclosed herein.

FIG. 4A is a block diagram illustrating two examples of IBFD in accordance with aspects disclosed herein. In a first example 400, uplink resources 404 and downlink resources 402 available for communication overlap in time and frequency. In particular, the uplink resources 404 fully overlap with the downlink resources 402. Use of such overlapping resources in frequency by a device to perform FD communication may be referred to as IBFD. In a second example 410, similar to the first example 400, uplink resources 414 overlap in time and frequency with downlink resources 412. However, in this example, the uplink resources 414 and downlink resources 412 only partially overlap in frequency. Use of such partially overlapping resources in frequency by a device to perform FD communication may also be referred to as IBFD.

Figure 4B:
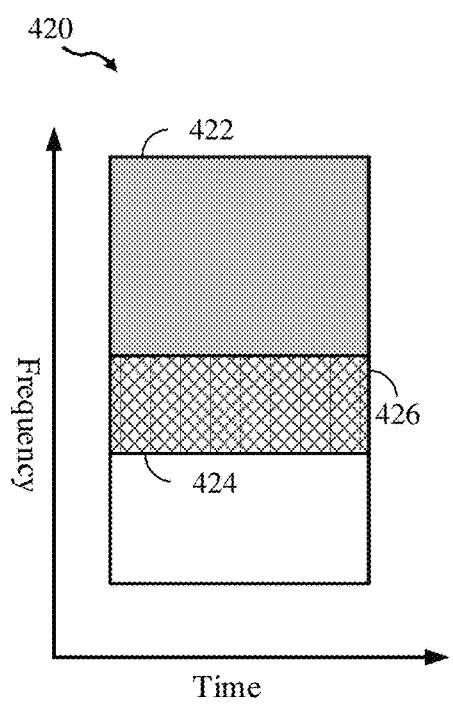
FIG. 4B is a block diagram illustrating an example of frequency division duplex (FDD), in accordance with aspects disclosed herein.

FIG. 4B is a block diagram illustrating an example 420 of FDD in accordance with aspects disclosed herein. In FDD, uplink resources and downlink resources available for communication are separated in frequency, such that they do not overlap. As shown in the example 420 of FIG. 4B, downlink resources 422 and uplink resources 424 are allocated over the same time period, such that uplink and downlink communication may occur at the same time to perform FD. However, uplink resources 424 and downlink resources 422 are allocated over separate frequency resources. In some examples, channel spacing 426 (e.g., referred to as a guard band) separates the downlink resources 422 from the uplink resources 424, such as to help reduce interference between uplink and downlink communications at a device.

In certain aspects, a BS 110 of the wireless communication network 100 may transmit timing advance information to a UE 120 to provide for time alignment of uplink and downlink communications. For example, the timing advance information may provide for alignment between slot and/or symbol boundaries used for uplink and downlink communication by the BS 110 and/or the UE 120. The timing advance information may include an offset of time between a start of a downlink slot and/or symbol, as observed by the UE 120a, and the start of an uplink slot and/or symbol transmission, as observed by the UE 120a. By controlling the offset appropriately for each UE 120, the BS 110 can control the timing of the uplink transmissions it receives. For example, a first UE 120 that is far from the BS 110 may encounter a larger propagation delay and may therefore need to start an uplink transmission in advance, relative to a second UE 120 that is closer to the BS 110 and encounters a smaller propagation delay.

Figure 5:
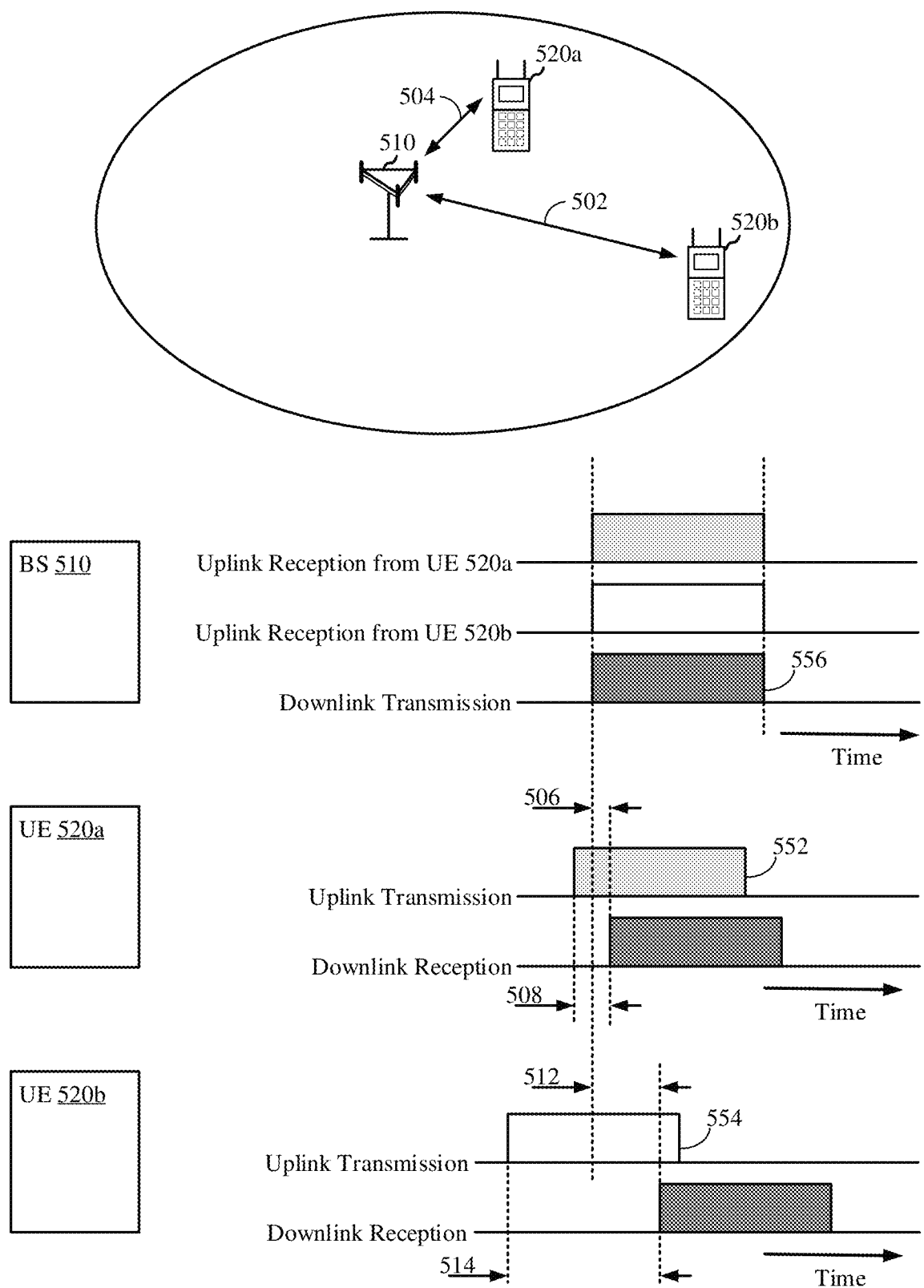
FIG. 5 is a block diagram illustrating a wireless communication network and an example set of uplink and downlink communications, in accordance with aspects disclosed herein.

FIG. 5 is a block diagram illustrating a wireless communication network between a BS 510 (e.g., BS 110a of FIGS. 1 and 2) and two UEs (e.g., UEs 120 of FIGS. 1 and 2), as well as an example set of uplink and downlink communications between the BS 510 and two UEs. Here, the two UEs include a first UE 520a and a second UE 520b, wherein the first UE 520a is closer to the BS 510 relative to the second UE 520b (e.g., a first distance 504 between the first UE 520a and the BS 510 is smaller than a second distance 502 between the second UE 520b and the BS 510).

In certain aspects, the BS 510 may perform measurements on uplink transmissions it receives from the first UE 520a and second UE 520b to determine timing advance information for each UE. For example, the BS 510 may provide the first UE 520a with timing advance information that takes into account propagation delays associated with the first distance 504, and the BS 510 may provide the second UE 520b with timing advance information that takes into account propagation delays associated with the second distance 502. Thus, the BS 510 may perform measurements for any UE or other wireless communication device having a communication link with the BS 510, and the BS 510 may be the source of timing advance information for those UEs or other wireless communication devices. In some examples, the BS 510 may perform measurements on reference signals (e.g., sounding reference signals (SRSs), demodulation reference signals (DMRS), etc.) of uplink transmissions, but it should be noted that the BS 510 may perform measurements on any signal transmitted from a UE or other wireless communication device to determine timing advance information corresponding to that device.

Based on the uplink measurements, the BS 510 may determine a timing correction for each UE in order to align the timing (e.g., slot and/or symbol boundaries) of uplink transmissions as received by the BS 110 with downlink transmissions. For example, if the timing of the first UE 520a needs correction, the BS 510 may transmit timing advance information specifically determined for the first UE 520a, based on measurements performed on uplink transmissions from the first UE 520a. In some examples, the timing advance information may include instructions for the first UE 520a to retard or advance timing of its uplink transmission 552, relative to current uplink timing, by a particular offset value (e.g., an amount of time).

Referring to FIG. 5, the BS 510 transmits a downlink transmission 556, and receives: a first uplink transmission 552 from the first UE 520a, and a second uplink transmission 554 from the second UE 520b. From the perspective of the BS 510, the timing of the first uplink transmission 552 and the second uplink transmission 554 are aligned with the timing of the downlink transmission 556.

For example, because the first UE 520a is located closer to the BS 510 than the second UE 520b, the first UE 520a may experience a smaller propagation delay 506 relative to the larger propagation delay 512 of the second UE 520b. Accordingly, the BS 510 may provide timing advance information to the first UE 520a that includes a first timing advance offset 508 sufficient to compensate for the smaller propagation delay 506, and to ensure that the timing of the first uplink transmission 552 is aligned with the downlink transmission from the BS 510 perspective. It should be noted that from the perspective of the first UE 520a, the first uplink transmission 552 is initiated prior to reception of the downlink transmission 556. Thus, while the first uplink transmission 552 is time aligned at the BS 510, there is a disparity between the timing of the first uplink transmission 552 and reception of the downlink transmission 556 from the perspective of the first UE 520a.

Because the second UE 520b is a greater distance from the BS 510 than the first UE 520a, the second UE 520b experiences a larger propagation delay 512. As such, the second UE 520b may require a second timing advance offset 514 that is greater than the first timing advance offset 508 in order for the second uplink transmission 554 to be time aligned at the BS 510. A larger value of the timing advance is required for the second device, which is located at a larger distance from the base station and thus experiences a larger propagation delay. It should be noted that from the perspective of the second UE 520b, the second uplink transmission 554 is initiated prior to reception of the downlink transmission 556. Thus, while the second uplink transmission 554 is time aligned at the BS 510, there is a significant disparity between the timing of the second uplink transmission 554 and reception of the downlink transmission 556 from the perspective of the second UE 520b.

Thus, the first uplink transmission 552 and the second uplink transmission 554 are aligned in time with the downlink transmission 556 at the BS 510. Time alignment at the BS 510 may reduce or prevent intra-cell interference in a wireless network. As used herein, intra-cell interference generally relates interference caused by signals within a serving cell associated with the BS 510 and UEs (e.g., first UE 520a and second UE 520b) within that cell. Intra-cell interference may degrade reliability of wireless communication within the serving cell. As illustrated, the symbols transmitted and received from the perspective of the first UE 520a and the second UE 520b are not time aligned, with varying severity. For example, from the perspective of the first UE 520a, timing of the first uplink transmission 552 is misaligned with timing of the downlink transmission 556. From the perspective of the second UE 520b, timing of the second uplink transmission 554 is misaligned with timing of the downlink transmission, wherein the misalignment from the perspective of the second UE 520b is greater than the misalignment from the perspective of the first UE 520a. As described in more detail below, the timing misalignment of symbols from the perspective of the first UE 520a may not cause interference. However, the greater the misalignment, the more likely a device such as the second UE 520b will experience interference detrimental to communication reliability.

It should be noted that while exact timing alignment, from the perspective of the BS 510, between the reception of uplink transmissions and transmission of downlink signaling is ideal, any timing misalignment of uplink transmissions received by the BS 510 may fall within a cyclic prefix characterized by a corresponding numerology (e.g., subcarrier spacing and cyclic prefix). As discussed, the BS 510 may then be able to perform interference cancellation. For example, a cyclic prefix having a duration of 4.7 may be used for a single subcarrier spacing of 15 kHz.

As used herein, a cyclic prefix may relate to a prefixing an OFDM symbol with a repetition of the end of the symbol. For example, a multipath environment may degrade the orthogonality between subcarriers because symbols received from reflected or delayed paths may overlap into a following symbol. The cyclic prefix addresses this problem by copying the tail of each symbol and pasting it onto the front of the symbol. In this way, any multipath components from a previous symbol fall within the effective guard time at the start of each symbol, and can be discarded.

Figure 6:
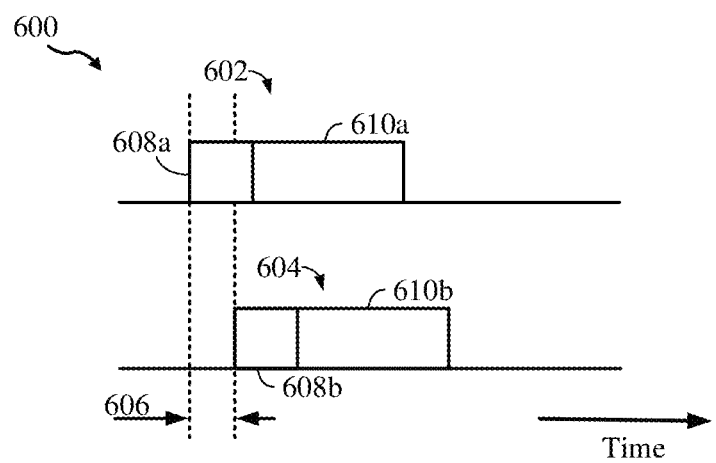
FIG. 6 is a block diagram illustrating two examples of timing alignment between two wireless data transmissions from the perspective of a UE, in accordance with aspects disclosed herein.
Figure 6:
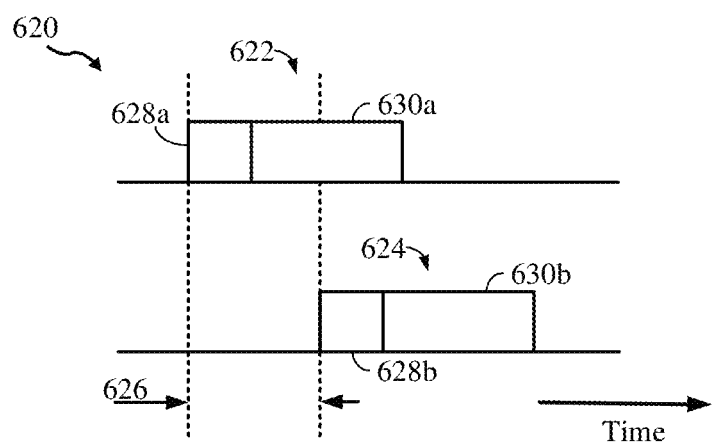

FIG. 6 is a block diagram illustrating two examples of timing alignment (e.g., slot and/or symbol alignment) between two wireless data transmissions from the perspective of a UE (e.g., UE 120a of FIGS. 1 and 2). A first example 600 illustrates an uplink symbol 602 transmitted by the UE 120a, the uplink symbol 602 including a first cyclic prefix 608a and a first payload portion 610a (e.g., including data, control information, and/or the like). The first example 600 also illustrates a downlink symbol 604 received by the UE 120a that includes a second cyclic prefix 608b and a second payload portion 610b. Here, the UE 120a applies a timing advance 606 to the uplink symbol 602, resulting in the uplink symbol 602 not being aligned with the downlink symbol 604 at the UE 120a. Such a misalignment may cause self-interference at the UE 120a; however, because the length of time of the timing advance 606 is less that the length of time associated with the cyclic prefix of the uplink symbol 602 and the downlink symbol 604, the UE 120a may cancel any self-interference caused by transmission of the uplink symbol 602.

A second example 620 illustrates an uplink symbol 622 transmitted by the UE 120a, the uplink symbol 622 including a first cyclic prefix 628a and a first payload portion 630a. The second example 620 also illustrates a downlink symbol 624 received by the UE 120a that includes a second cyclic prefix 628b and a second payload portion 630b. Here, the UE 120a applies a timing advance 626 to the uplink symbol 622, resulting in the uplink symbol 622 not being aligned with the downlink symbol 624 at the UE 120a. In contrast to the first example 600, the misalignment caused by the timing advance 626 is greater that the length of time associated with the cyclic prefix of the uplink symbol 622 and the downlink symbol 624. As such, the UE 120a may experience inter-symbol interference despite any self-interference cancelation performed by the UE 120a. Such inter-symbol interference may be detrimental to the reliability of FD communications. As used herein, inter-symbol interference relates to a distortion of a signal in which one symbol interferes with subsequent symbols. Essentially, the one symbol behaves like noise to the subsequent symbols, making the communication less reliable.

Accordingly, what is needed are techniques and apparatus for reducing intra-cell interference and inter-symbol interference in both UEs and BSs that communicate using FD modes of wireless communication.

Example Timing Alignment in Full-Duplex (FD) Communication

Aspects of the present disclosure provide methods and apparatus for full-duplex (FD) communication, wherein a base station (e.g., BS 110a of FIGS. 1 and 2) is configured to determine timing advance information for one or more (e.g., each) user equipment (e.g., UE 120a of FIGS. 1 and 2) of one or more UEs 120 in communication with the BS 110a. The BS 110a may also determine a duration or time length of a cyclic prefix for such UE(s) 120, wherein each cyclic prefix is based on timing advance information determined for a corresponding UE 120. As discussed in more detail below, the timing advance information and the cyclic prefix length determined for a particular UE 120a are determined in order to provide time aligned (e.g., overlapping) uplink and downlink symbols in an FD mode of communication between the BS 110a and the one or more UEs.

As discussed, timing advance includes a negative offset of an uplink transmission at the UE 120a, wherein the offset is between the start of a downlink transmission received by the UE 120a and the uplink transmission. This offset provided by timing advance is intended to ensure that uplink transmissions from multiple different UEs 120 are time aligned at the BS 110a. In some examples, the offset may also help to time align transmission of the downlink transmission and reception of one or more uplink transmissions at the BS 110a. However, certain aspects described herein may be directed to time aligning downlink transmissions and uplink transmissions at both the BS 110a and the UE 120a to reduce or eliminate interference at both endpoints.

In certain aspects, the BS 110a may time align uplink transmissions with downlink transmissions at the UE 120a. For example, the BS 110a may provide a timing advance to the UE 120a so that time resources over which a UE 120a receives a downlink symbol overlap with the time resources over which the UE 120a transmits an uplink symbol. However, aligning uplink and downlink symbols at the UE 120a may lead to misalignment of the symbols at the BS 110a, which may lead to intra-cell interference.

In particular, intra-cell interference may occur when either of the following equations are true:

$$d_2 - d_1 > \frac{CP}{2} \qquad \text{Equation 1}$$

$$d_2 > \frac{CP}{2} \qquad \text{Equation 2}$$

Here, $d_2$ is equal to the greatest propagation delay between BS 110a and a UE 120 among a plurality of UEs 120, $d_1$ is equal to the smallest propagation delay between BS 110a and a UE 120 among the plurality of UEs 120, and CP is equal to the duration of a default cyclic prefix calculated by the BS 110a for uplink transmissions and/or downlink transmissions. Specifically, equation 1 may be used as an indication of whether multiple uplink transmissions will be time aligned as they are received by the BS 110a. For example, if equation 1 is false, then it may be assumed that a first cyclic prefix (e.g., associated with a transmission from a first UE corresponding to propagation delay $d_1$) may overlap with a second cyclic prefix (e.g., associated with a transmission from a second UE corresponding to propagation delay $d_2$). Equation 2 may be used as an indication of whether there could be potential for collision between a delayed uplink transmission and a next downlink transmission. For example, if equation 2 is false, then it may be assumed that an uplink transmission from the second UE corresponding to propagation delay $d_2$ does not pose a threat of collision with a downlink transmission. If either of equations 1 or 2 are true, then the BS 110a may determine that cyclic prefixes of the downlink symbol and uplink symbol are not overlapping, which may cause intra-cell interference.

However, if equations 1 and 2 are false, then the BS 110a may proceed to time align uplink transmissions with downlink transmissions at the UE 120a using timing advance. In some examples, time aligning uplink transmissions with downlink transmissions at the UE 120a may include setting, by the BS 110a, a timing advance to zero (e.g., no timing advance used by the UE 120a).

In certain aspects, the BS 110a may attempt to time align uplink transmissions with downlink transmissions at the UE 120a and at the BS 110a. As discussed, timing advance may offset an uplink transmission so that it aligns with a downlink transmission from the perspective of the BS 110a. However, the BS 110a may instead provide a partial timing advance (e.g., a fraction of a calculated timing advance) to a UE 120a so that any misalignment of uplink transmissions and downlink transmissions are split between the UE 120a and the BS 110a. For example, the BS 110a may determine a default timing advance to align uplink transmissions with downlink transmissions from the perspective of the BS 110a. However, if the BS 110a provides the default timing advance to the UE 120a, the uplink transmission may become misaligned with the downlink transmission from the UE 120a perspective. Thus, the BS 110a may provide only a fraction of the determined timing advance to the UE 120a. For example, the partial timing advance may be determined for a UE based on Equation 3.

$$\text{partial timing advance} = \alpha(TA) \qquad \text{Equation 3}$$

where $\alpha(TA) < 2d$, $\alpha < 1$, and TA is a default timing advance duration for uplink transmissions, as calculated by the BS 110a.

However, a partial timing advance may result in intra-cell interference when any of the following equations are true:

$$2(1-\alpha_2)d_2 - 2(1-\alpha_1)d_1 > CP \qquad \text{Equation 4}$$

$$2(1-\alpha_2)d_2 > CP \qquad \text{Equation 5}$$

If equation 4 is true, then the BS 110a may determine that cyclic prefixes of a first uplink symbol and a second uplink symbol are not overlapping from the perspective of the BS 110a, which may cause intra-cell interference at the BS 110a. Similarly, if equation 5 is true, then the BS 110a may determine that cyclic prefixes of a delayed uplink transmission and a next downlink transmission are not overlapping, which may cause interference at one or more of the UE 210a or BS 110a. However, if equations 4 and 5 are false, then the BS 110a may proceed to use partial timing advance to time align uplink transmissions with downlink transmissions at the UE 120a and BS 110a.

In certain aspects, the BS 110a may configure the UE 120a to use an extended duration cyclic prefix (e.g., "extended cyclic prefix" (ECP)) to time align uplink transmissions and downlink transmissions at the UE 120a and BS 110a. In some examples, an extended cyclic prefix may be defined as a cyclic prefix of an uplink symbol that has a longer duration than a default cyclic prefix for an uplink symbol. In some cases, an extended cyclic prefix may be used once at an uplink symbol transmitted at the beginning of an uplink allocation (e.g., a slot scheduled for uplink communication by a UE 120a) while any remaining uplink symbols transmitted in the uplink allocation may use a default cyclic prefix duration determined by the BS 110a.

The use of an extended cyclic prefix is provided in more detail below, however, it should be noted that the use of an extended cyclic prefix (ECP) may result in intra-cell interference when the following equation is true:

$$d_2 - d_1 > \frac{CP}{2} \qquad \text{Equation 6}$$

In certain aspects, the BS 110a may configure the UE 120a to use a combination of: (i) an extended cyclic prefix, and (ii) a partial timing advance, to time align uplink transmissions and downlink transmissions at the UE 120a and BS 110a. For example, the BS 110a may determine an extended cyclic prefix according to Equation 7:

$$\text{extended cyclic prefix} = \beta(TA) + CP \qquad \text{Equation 7}$$

where $\beta<1$, and TA is the default timing advance duration for uplink transmissions, as calculated by the BS 110a. That is, the BS 110a may determine the extended cyclic prefix based on the timing advance which is also determined by the BS 110a. The BS 110a may also determine the $\alpha$ and $\beta$ values such that they satisfy Equation 8.

$$2(1+\beta_2-\alpha_2)d_2 - 2(1+\beta_1-\alpha_1)d_1 \leq CP \qquad \text{Equation 8}$$

$\beta_2$ and $\alpha_2$ may correspond to a second UE, and $\beta_1$ and $\alpha_1$ may correspond to a first UE. Here, if equation 8 is satisfied for any pair of UEs (e.g., the first UE and the second UE) that are scheduled for simultaneous uplink transmission, then intra-cell interference caused by the simultaneous uplink transmission may be reduced or eliminated. $d_1$ and $d_2$ may correspond to a propagation delay corresponding to the first UE and second UE, respectively.

Accordingly, in certain aspects, a BS 110a may use one or more of Equations 1-8 to determine a particular method of timing advance that may work for a particular situation. Table 1 below provides a summary of the four described methods of timing advance.

TABLE 1

| Method | Timing Advance (TA) | UL/DL Alignment at UE | ICI Occurs at BS when: | Max. Propagation Delay |
|---|---|---|---|---|
| Time aligning UL/DL at UE | TA = 0 | UL/DL symbols aligned | $d_2 - d_1 > {}^{CP}\!/_2$ | $d_2 > {}^{CP}\!/_2$ |
| Partial TA | $\alpha(TA)$, ($\alpha < 1$) | CP aligned | $2(1 - \alpha_2)d_2 - 2(1 - \alpha_1)d_1 > CP$ | $2(1 - a_2)d_2 > CP$ |
| Extended CP | Default TA | UL/DL symbols aligned | $d_2 - d_1 > {}^{CP}\!/_2$ | N/A |
| Extended CP with Partial TA | $\alpha(TA)$, ($\alpha < 1$) | CP aligned | $2(1 + \beta_2 - \alpha_2)d_2 - 2(1 + \beta_1 - \alpha_1)d_1 > CP$ | N/A (e.g., guard symbol) |

Figure 7:
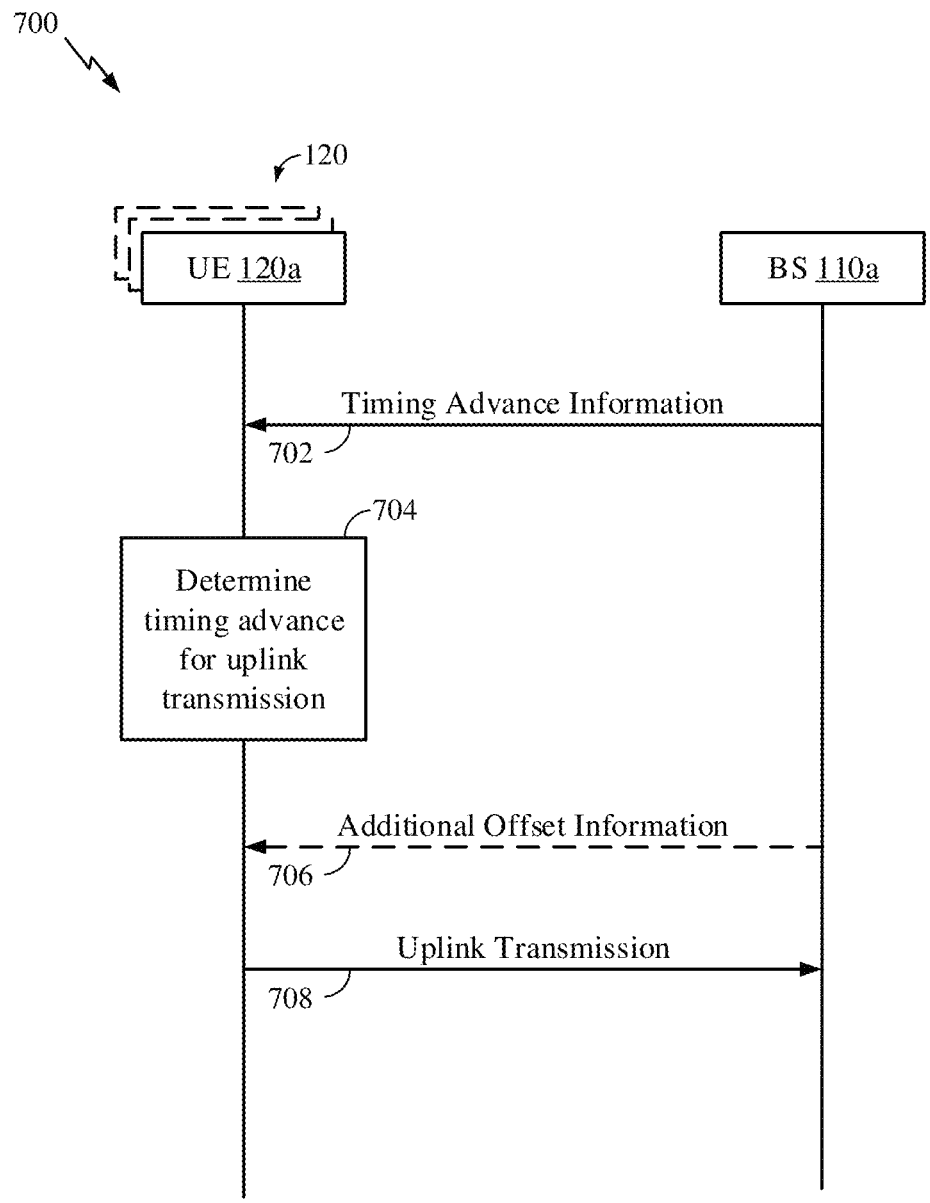
FIG. 7 is a call-flow diagram illustrating an example communication of timing advance information from a BS to a UE, in accordance with certain aspects of the present disclosure.

FIG. 7 is a call-flow diagram illustrating an example communication 700 of timing advance information from a BS 110a to a UE 120a. To determine a timing advance for the UE 120a, the BS 110 may measure the timing of uplink transmissions it receives from the UE 120a relative to the timing of downlink transmissions made by the BS 110a. If the uplink transmission is not time aligned with the downlink transmission from the BSs perspective, the BS 110a may transmit first signaling 702 for adjusting uplink transmission timing, wherein the first signaling 702 includes timing advance information for the UE 120a. The timing advance information may include a timing offset value ($N_{TA}$) indicative of an amount of time that the UE 120a should offset its uplink transmission.

In a first processing step 704, the UE 120a may determine a timing advance based on the received $N_{TA}$ and one or more other values associated with characteristics of the communication network. For example, the UE 120a may determine the timing advance of its uplink transmissions by summing an additional value ($N_{TA,Offset}$) with the timing offset value ($N_{TA}$) received from the BS 110a. In some examples, the additional value ($N_{TA,Offset}$) may be provided to the UE 120a as part of the timing advance information of the first signaling 702. The additional value ($N_{TA,Offset}$) may provide an additional amount of timing advance time to allow BS 110 communication circuitry (e.g., one or more of the elements illustrated in FIG. 2) enough time to switch between transmission mode (for downlink transmission) and receive mode (for uplink reception). The additional value ($N_{TA,Offset}$) may depend on the characteristics of the network, for example, the frequency range (e.g., frequency range 1 (FR1), frequency range 2 (FR2), etc.) and an associated numerology.

However, the BS 110a performs transmission and reception simultaneously when communicating in FD mode. Thus, because both transmit circuitry and receive circuitry are simultaneously active, the UE 120a may no longer require the additional value ($N_{TA,Offset}$) to determine a proper offset for timing advance of its uplink transmissions. Accordingly, the BS 110a may set the additional value ($N_{TA,Offset}$) to zero (0) in the first signaling 702. Optionally, the BS 110a may set the additional value ($N_{TA,Offset}$) to zero (0) in a second signaling 706. In some examples, the BS 110a may transmit the first signaling 702 and/or the second signaling 706 via radio resource control (RRC) message (e.g., during RRC configuration) or in a medium access control (MAC) control element (CE) (e.g., a dedicated downlink MAC CE, or in a particular field of a timing advance MAC CE). The UE 120a may then transmit an uplink transmission 708 to the BS 110a such that the uplink transmission is offset in time according to the timing advance.

By setting the additional value ($N_{TA,Offset}$) to zero at the UE 120a, timing misalignment between uplink and downlink communications at the BS 110a may be reduced or eliminated because the FD communications do not require the UE 120a to consider additional time required for the BS 110a to switch between transmit and receive modes.

Figure 8:
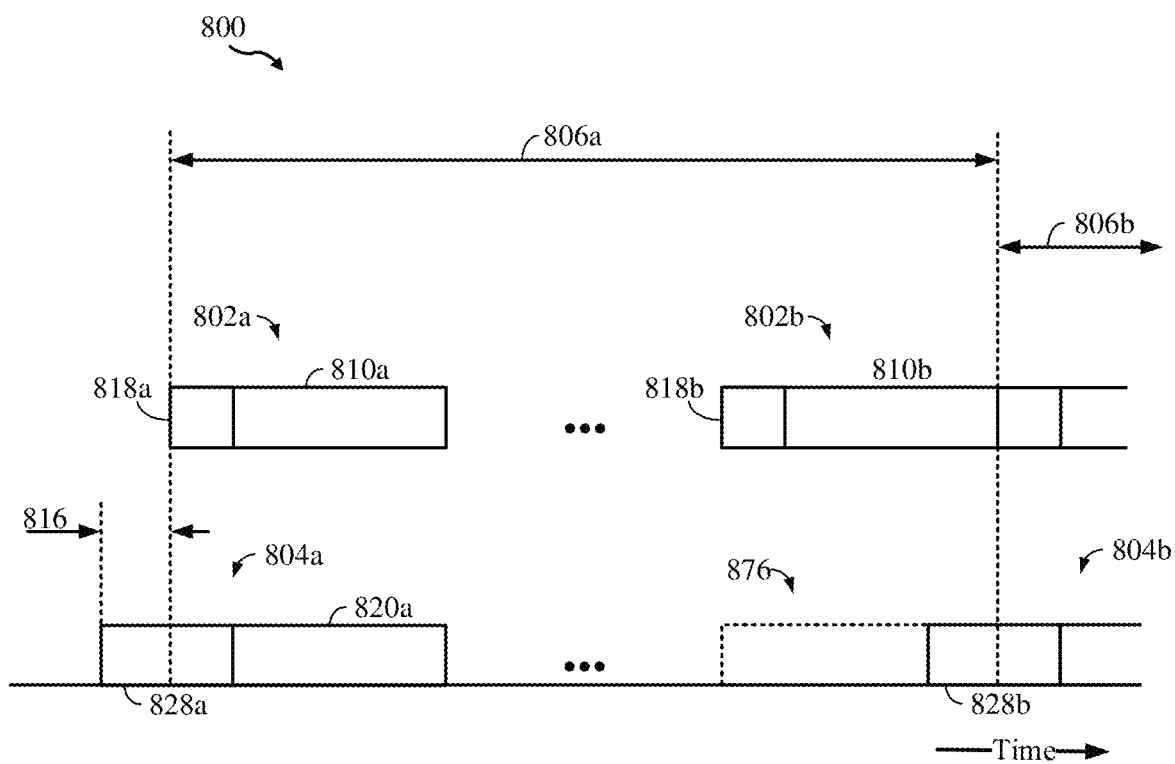
FIG. 8 is a block diagram illustrating extended cyclic prefix durations from the perspective of a UE, in accordance with certain aspects of the present disclosure.

FIG. 8 is a block diagram illustrating extended cyclic prefix durations from the perspective of a UE (e.g., UE 120a of FIGS. 1 and 2). For example, an extended cyclic prefix may have a duration that is longer than a default cyclic prefix duration (e.g., a default cyclic prefix duration of 4.7 μs for 15 kHz subcarrier spacing). The UE 120a may use an extended cyclic prefix in a first symbol of an uplink allocation (e.g., a slot, subframe, etc.), wherein the duration of the extended cyclic prefix is determined based on a timing advance.

In one example, a BS (e.g., 110a of FIGS. 1 and 2) may determine a timing advance for the UE 120a to align the timing of uplink and downlink symbols from the perspective of the BS 110a (e.g., from the perspective of the BS 110a, the timing of a received uplink symbol is time-aligned with a downlink symbol such that the cyclic prefixes of each symbol overlap in time). The BS 110a may transmit timing advance information to the UE 120a, wherein the timing advance information includes an indication of the determined timing advance. The timing advance information may configure the UE 120a to offset uplink transmissions by a timing advance duration of time.

In some examples, the timing advance information may configure the UE 120a to use an extended cyclic prefix at the first symbol of an uplink allocation. The UE 120a may determine a duration of the extended cyclic prefix such that the cyclic prefix of a downlink transmission overlaps, from the perspective of the UE 120a, with the cyclic prefix of an uplink transmission.

As shown, the BS 110 may transmit a plurality of downlink symbols for the duration of a first uplink allocation 806a (e.g., a slot). The plurality of downlink symbols include a first downlink symbol 802a at the start of the first uplink allocation 806a, and a second downlink symbol 802b at the end of the first uplink allocation 806a. The first downlink symbol 802a includes a first downlink cyclic prefix 818a and a first downlink payload portion 810a, and the second downlink symbol 802b includes a second downlink cyclic prefix 818b and a second downlink payload portion 810b.

The UE 120a may also transmit a plurality of uplink symbols for the duration of the first uplink allocation 806a. The UE 120a uplink transmissions may occur while the BS 110a simultaneously transmits downlink symbols for the duration of the first uplink allocation 806a, in FD communication (e.g., in-band full duplex (IBFD) or subband frequency-division duplex (FDD)). The plurality of uplink symbols may include a first uplink symbol 804a toward the beginning of the first uplink allocation 806a, and a shortened uplink symbol 876 at the end of the first uplink allocation 806a. The first uplink symbol 804a includes a first cyclic prefix 828a and a first uplink payload portion 820a, and shortened uplink symbol 876 may be implemented as a guard period. It should be noted that the first cyclic prefix 818a and the second cyclic prefix 818b each have a duration that is shorter than the duration of the first cyclic prefix 828a.

Here, the UE 120a may offset and extend a first cyclic prefix 828a of the first uplink symbol 804a of the first uplink allocation 806a. In this example, the UE 120a offsets the start of the first uplink symbol 804a according to the timing advance 816, and extends the first cyclic prefix 828a so that, from the perspective of the UE 120a, the first cyclic prefix 828a overlaps with the first cyclic prefix 818a of a first downlink symbol 802a. After transmitting the first uplink symbol 804a, the UE 120a may continue transmitting uplink symbols using a default cyclic prefix duration (e.g., a default cyclic prefix length or duration used by the UE 120a).

As such, if the UE 120a offsets and extends a cyclic prefix of a second uplink symbol 804b of a second uplink allocation 806b that immediately follows the first uplink allocation 806a, then a second cyclic prefix 828b of the second uplink symbol 804b may extend into the first uplink allocation 806a. Thus, in some examples, the UE 120a may transmit a cyclic prefix during two adjacent slots (e.g., the first uplink allocation 806a and the second uplink allocation 806b). As such, the last symbol to be transmitted only in the first uplink allocation 806a may be reduced in size. In this example, the shortened uplink symbol 876 may be used as a guard period. Accordingly, the UE 120a may not transmit uplink singling during the guard period.

Alternatively, the UE 120a may instead reduce the duration of the second uplink allocation 806b so that the last uplink symbol transmitted in the first uplink allocation 806a is a full uplink symbol. In this example, the UE 120a may transmit uplink data on the last uplink symbol instead of using it as a guard period.

Although FIG. 8 is directed to FD communications between a single UE 120a and BS 110a, the techniques described may be implemented between a BS 110a and a plurality of UEs (e.g., UEs 120 of FIG. 1). For example, the BS 110a may determine a timing advance for the plurality of UEs 120 to ensure that uplink transmissions from each of the plurality of UEs 120, as received at the BS 110a, are time aligned with downlink transmissions. Thus, the BS 110a may configure one or more of the plurality of UEs 120 to use an extended cyclic prefix according to a corresponding timing advance.

In the case of a plurality of UEs 120, the BS 110a may determine a distance between the BS 110a and each of the plurality of UEs 120. The BS 110a may determine which propagation delay is the greatest delay (e.g., the longest delay between an uplink transmission by a UE and receipt of the transmission by the BS 110a) and/or which distance is the smallest distance (e.g., the shortest delay between an uplink transmission by a UE and receipt of the transmission by the BS 110a). In some examples, the BS 110a may configure the plurality of UEs 120 to extend the duration of corresponding cyclic prefixes of uplink transmissions if Equation 1 is not true, such that Equation 6 is true.

By time aligning, from the perspective of the BS 110a, an uplink transmission with a downlink transmission, intra-cell interference at the BS 110a and self-interference at the UE 120a can be minimized or eliminated.

Figure 9:
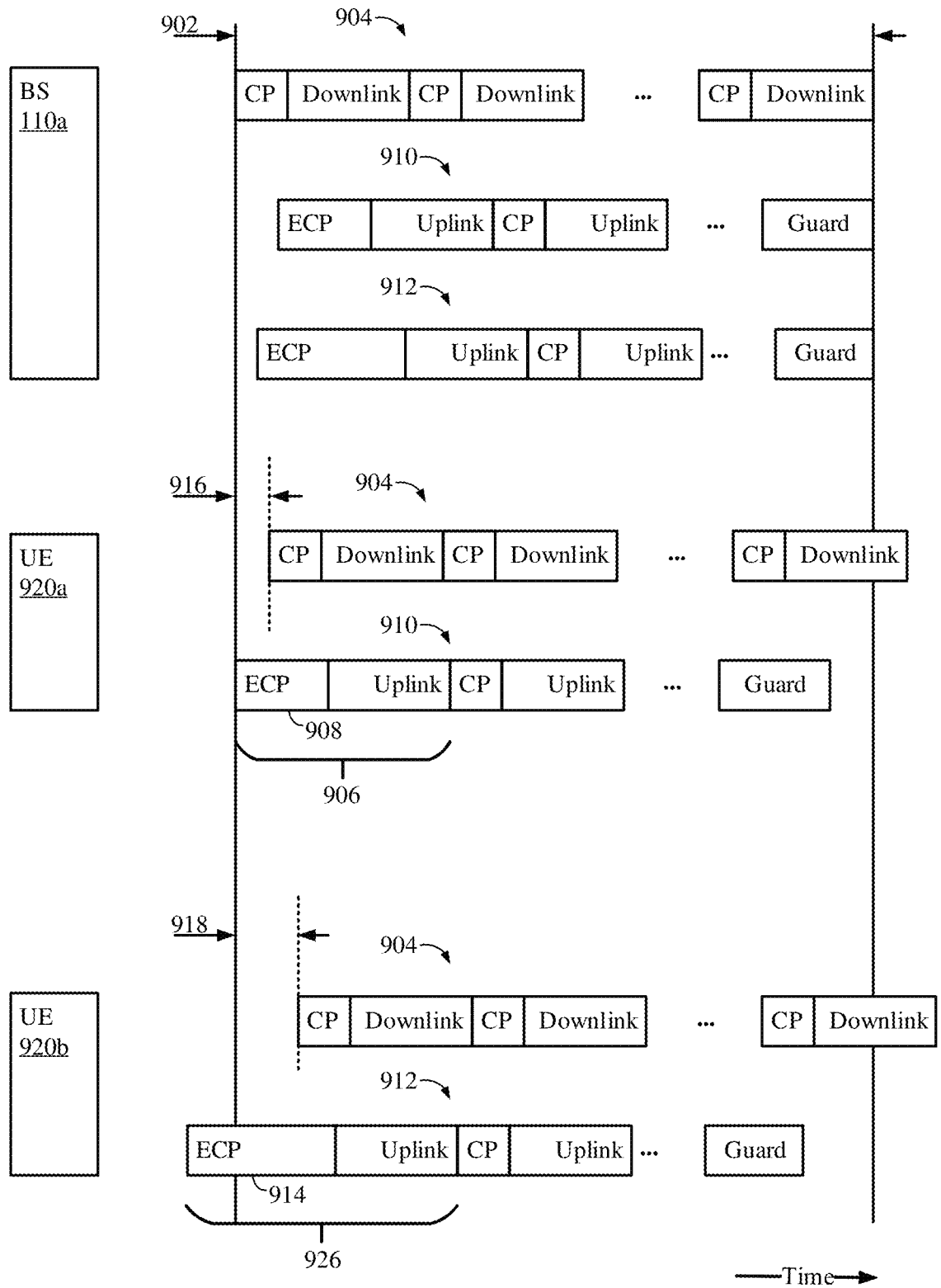
FIG. 9 is a block diagram illustrating an example full duplex (FD) communication between a BS and UEs, in accordance with certain aspects of the present disclosure.

FIG. 9 is a block diagram illustrating an example FD communication between a BS 110a, and a first UE 920a and a second UE 920b (e.g., a first UE 120 and a second UE 120 of FIG. 1). In this example, the UEs 920 may communicate using a combination of: (i) an extended cyclic prefix, and a (ii) a partial timing advance. Prior to scheduling an uplink allocation 902 for uplink transmissions by the first UE 920a and the second UE 920b, the BS 110a may first determine timing advance and cyclic prefix information for each of the UEs 920.

The BS 110a may determine a partial timing advance for each of the first UE 920a and the second UE 920b based on a propagation delay (d) associated with each UE. The BS 110a may also determine a duration for an extended cyclic prefix for a UE based on Equation 7 above.

Once the BS 110a has determined the partial timing advance (based on a determined timing advance) and the extended cyclic prefix for each of the plurality of UEs 920, the BS 110a may schedule the UEs 920 to transmit during the uplink allocation 902, and transmit an indication of the partial timing advance and extended cyclic prefix to each corresponding UE for use during the uplink allocation 902. In some examples, the BS 110a may transmit an indication of a first cyclic prefix length (e.g., a length of an extended cyclic prefix) to the first UE 920a, and transmit a second cyclic prefix length (e.g., a length of an extended cyclic prefix) to the second UE 920b, wherein the first UE 920a and the second UE 920b are scheduled to transmit uplink data during the same time period (e.g., same uplink allocation 902). In another example, if the first cyclic prefix length and the second cyclic prefix length are the same length, the BS 110a may group the first UE and the second UE, and any other UEs that share the same cyclic prefix length, and schedule the group of UEs to transmit during the same uplink allocation 902.

As shown in FIG. 9, within an uplink allocation 902, the BS 110a may transmit a plurality of downlink symbols 904, each with a cyclic prefix having a default duration. Each of the plurality of UEs 920 may perform uplink transmissions during the uplink allocation 902 simultaneously with the downlink transmissions. Here, the first UE 920a has the smallest propagation delay 916 relative to a larger propagation delay 918 of the second UE 920b. Accordingly, the first UE 920a performs a plurality of uplink transmissions within the uplink allocation 902. The plurality of uplink transmissions include a first plurality of uplink symbols 910, wherein a first symbol 906 includes an extended cyclic prefix (ECP) 908 as indicated by the BS 110a. The remaining uplink symbols each include a cyclic prefix (CP) having a default length. In some examples, the default length of the cyclic prefix may be determined by the first UE 120a, or may be determined by the BS 110a and provided to the first UE 120a. Similarly, the second UE 920b performs a plurality of uplink transmissions within the uplink allocation 902. The plurality of uplink transmissions include a second plurality of uplink symbols 912, wherein a first symbol 926 includes an extended cyclic prefix (ECP) 914 as indicated by the BS 110*a*. The remaining uplink symbols each include a cyclic prefix (CP) having a default length.

Note that the BS 110*a* configured the first UE 920*a* and the second UE 920*b* with a partial timing advance as well as an extended cyclic prefix durations to ensure that the extended cyclic prefix of the first symbols 906/926 transmitted by the UEs 920 overlap in time with corresponding cyclic prefix of a downlink symbol, and subsequent cyclic prefixes of the first uplink symbols 910 and the second uplink symbols 912 overlap in time with a corresponding cyclic prefix of a downlink symbol. From the perspective of the UEs 920, the overlap minimizes and prevents self-interference at the UEs 920.

Note also that the uplink cyclic prefixes (including extended cyclic prefixes and cyclic prefixes having a default duration) also overlap with corresponding cyclic prefixes of the downlink symbols 904 from the perspective of the BS 110*a*. Such overlap minimize and prevents intra-cell interference at the BS 110*a*.

In certain aspects, the BS 110*a* may activate and/or deactivate a UEs 920 use of an extended cyclic prefix. For example, the BS 110*a* may transmit dedicated signaling via radio resource control (RRC) message or medium access control (MAC) control element (CE) indicating whether a UE 920 may or may not utilize an extended cyclic prefix. In some examples, the UE 920 may first transmit signaling to the BS 110*a* indicating that the UE 920 is configured and able to use an extended cyclic prefix prior to the BS 110*a* activating the UEs 920 ability.

In certain aspects, the UE 920 may automatically control whether it will use an extended cyclic prefix or not in a particular uplink allocation. For example, the UE 920 may automatically activate use of an extended cyclic prefix when the UE 920 engages in FD communication, or switches to FD communication from half-duplex (HD) communication. In another example, the UE 920 may automatically activate use of an extended cyclic prefix for uplink communications when the UE 920, while in FD communication, receives an indication of a timing advance that is greater than a threshold value. For example, if the UE 920 receives an indication of a timing advance duration that is greater than 3 µs, the UE 920 may automatically activate the use of an extended cyclic prefix. Alternatively, the BS 110*a* may control activation of an extended cyclic prefix by the UE 920 in the foregoing examples instead of the UE 920.

In certain aspects, the UE 920 may determine an extended cyclic prefix duration and/or a default cyclic prefix duration based on a mapping between a timing advance received from the BS 110*a* and a corresponding extended cyclic prefix duration. For example, the BS 110*a* may transmit an indication of a mapping between each of a plurality of cyclic prefix lengths or durations and a plurality of uplink timing advances. In some examples, the mapping may include a one-to-one mapping between each of the plurality of cyclic prefix lengths and a unique uplink timing advance. Alternatively, the BS 110*a* may provide a mapping to the UE 920 wherein each of the plurality of cyclic prefix lengths map to a group or subset of timing advance values. In this example, the mapping may include multiple unique groups of timing advance values, wherein each group includes one or more unique timing advance values. As such, the mapping may be composed of multiple levels of cyclic prefix lengths, wherein each level corresponds to one or more timing advance values.

In certain aspects, the BS 110*a* may transmit dedicated signaling to the UE 920 to indicate the duration of an extended cyclic prefix and/or a default cyclic prefix duration. For example, the dedicated signaling may be communicated via RRC message or MAC-CE.

In certain aspects, a UE 920 may be configured for carrier aggregation. For example, the BS 110*a* may provide for aggregation of frequency resources (e.g., sub-6 GHz carriers, above-6 GHz carriers, mmWave carriers, etc.) controlled by a single integrated MAC layer. In one example, the UE 920 may be configured with a conventional uplink and downlink carrier pair as well as a supplementary uplink carrier, where both the conventional uplink and supplementary uplink provide communication links between the UE 920 and the same BS 110*a*. In such an example, the BS 110*a* may determine a cyclic prefix length for one of the carriers, and instruct the UE 920 to apply the same cyclic prefix length to both carriers. That is, the UE 920 may use the same cyclic prefix length for both carriers. Similarly, the BS 110*a* may be grouped into a timing advance group of other BSs, wherein each of the BS 110*a* and the other BSs share the same timing advance with at least one UE 920. Because the timing advance of each BS in the group is the same, the UE 920 may use the same cyclic prefix duration in communications.

Figure 10:
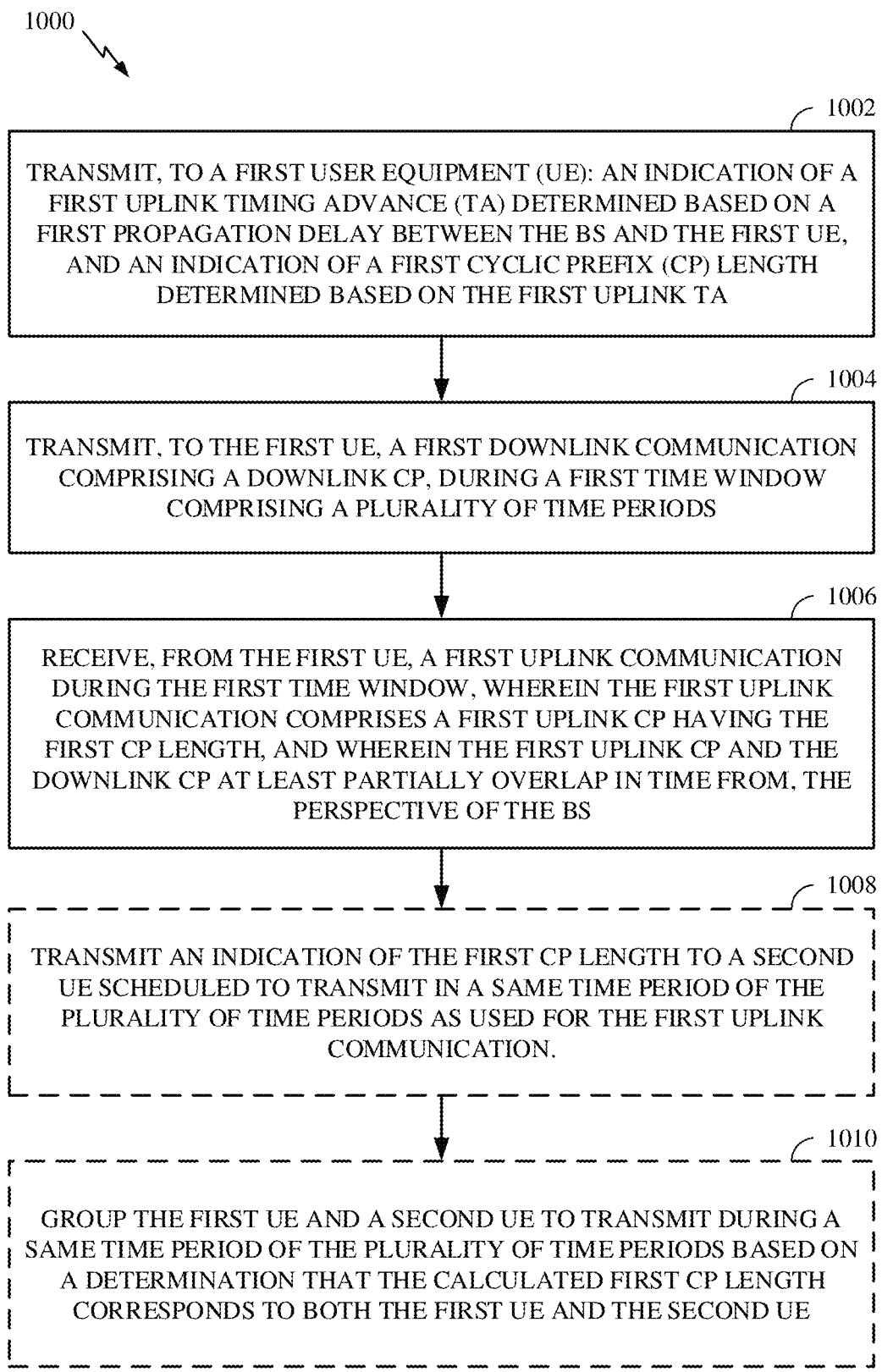
FIG. 10 is a flow diagram illustrating example operations for wireless communication, in accordance with certain aspects of the present disclosure.

FIG. 10 is a flow diagram illustrating example operations 1000 for wireless communication, in accordance with certain aspects of the present disclosure. The operations 1000 may be performed, for example, by a BS (e.g., such as the BS 110*a* in the wireless communication network 100). The operations 1000 may be complementary to the operations 1100 performed by the UE illustrated in FIG. 11. The operations 1000 may be implemented as software components that are executed and run on one or more processors (e.g., controller/processor 240 of FIG. 2). Further, the transmission and reception of signals by the BS in operations 1000 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1000 may begin, at a first block 1002, by transmitting, to a first user equipment (UE): an indication of a first uplink timing advance (TA) determined based on a first propagation delay between the BS and the first UE, and an indication of a first cyclic prefix (CP) length determined based on the first uplink TA.

The operations 1000 may proceed, at a second block 1004, by transmitting, to the first UE, a first downlink communication comprising a downlink CP, during a first time window comprising a plurality of time periods.

The operations 1000 may proceed, at a third block 1006, by receiving, from the first UE, a first uplink communication during the first time window, wherein the first uplink communication comprises a first uplink CP having the first CP length, and wherein the first uplink CP and the downlink CP at least partially overlap in time from, the perspective of the BS.

In some examples, the operations 1000 may optionally include a fourth block 1008, wherein the first UE proceeds by transmitting an indication of the first CP length to a second UE scheduled to transmit in a same time period of the plurality of time periods as used for the first uplink communication.

In some examples, the operations 1000 may optionally include a fourth block 1010, wherein the first UE proceeds by grouping the first UE and a second UE to transmit during a same time period of the plurality of time periods based on a determination that the calculated first CP length corresponds to both the first UE and the second UE.

In certain aspects, the first CP length is longer than a length of the downlink CP. For example the first CP may be an extended CP, and the length of the downlink CP may have a default CP length.

In certain aspects, a last time period in time of the plurality of time periods is a guard period where the first UE refrains from transmitting. For example, as illustrated in FIG. 8, if the first UE transmits a symbol having an extended CP during an uplink allocation, then that extended CP may result in the first UE being unable to transmit a whole symbol at the end of the uplink allocation. Accordingly, the first UE may use any left over time remaining in the uplink allocation as a guard period.

In certain aspects, the first time window has a first duration, wherein a second time window after and adjacent to the first time window has a second duration, wherein the first duration is greater than the second duration. For example, if the first UE transmits an uplink symbol with an extended CP, then the BS and the first UE may extend the duration of the first time window. For example, if the first time window is a slot for uplink allocation, then the first UE and the BS may extend the duration of the slot to accommodate a complete set of symbols wherein one of the symbols includes an extended CP.

In certain aspects, the first CP length is calculated based on the first uplink TA and a default CP length, and wherein a length of the downlink CP is equal to the default CP length. For example, the BS may use Equation 7 to calculate the first CP length. As such, the first CP is an extended CP.

In certain aspects, the first uplink TA is calculated to obtain: (i) the at least partial overlap in time, from the perspective of the first UE, of the first uplink CP and the downlink CP, and (ii) an at least partial overlap in time, from the perspective of the BS, of the first uplink CP and a second uplink CP transmitted by a second UE.

In certain aspects, transmitting the indication of the first uplink TA and the indication of the first CP length further comprises transmitting, to the first UE, via one or more of a radio resource control (RRC) message or a medium access control (MAC) control element (CE): a plurality of CP lengths including the first CP length; and a mapping between each of the plurality of CP lengths and a plurality of uplink TAs including the first uplink TA.

In certain aspects, the mapping comprises a one-to-one mapping between each of the plurality of CP lengths and a unique uplink TA of the plurality of uplink TAs.

In certain aspects, each of the plurality of CP lengths map to a subset of TAs of the plurality of uplink TAs, the plurality of uplink TAs comprising multiple subsets.

In certain aspects, transmitting the indication of the first CP length further comprises transmitting the first CP length via one of a radio resource control (RRC) or a medium access control (MAC) control element (CE).

In certain aspects, the indication of the first CP length comprises an integer configured to indicate an amount of time to add to a default CP length.

Figure 11:
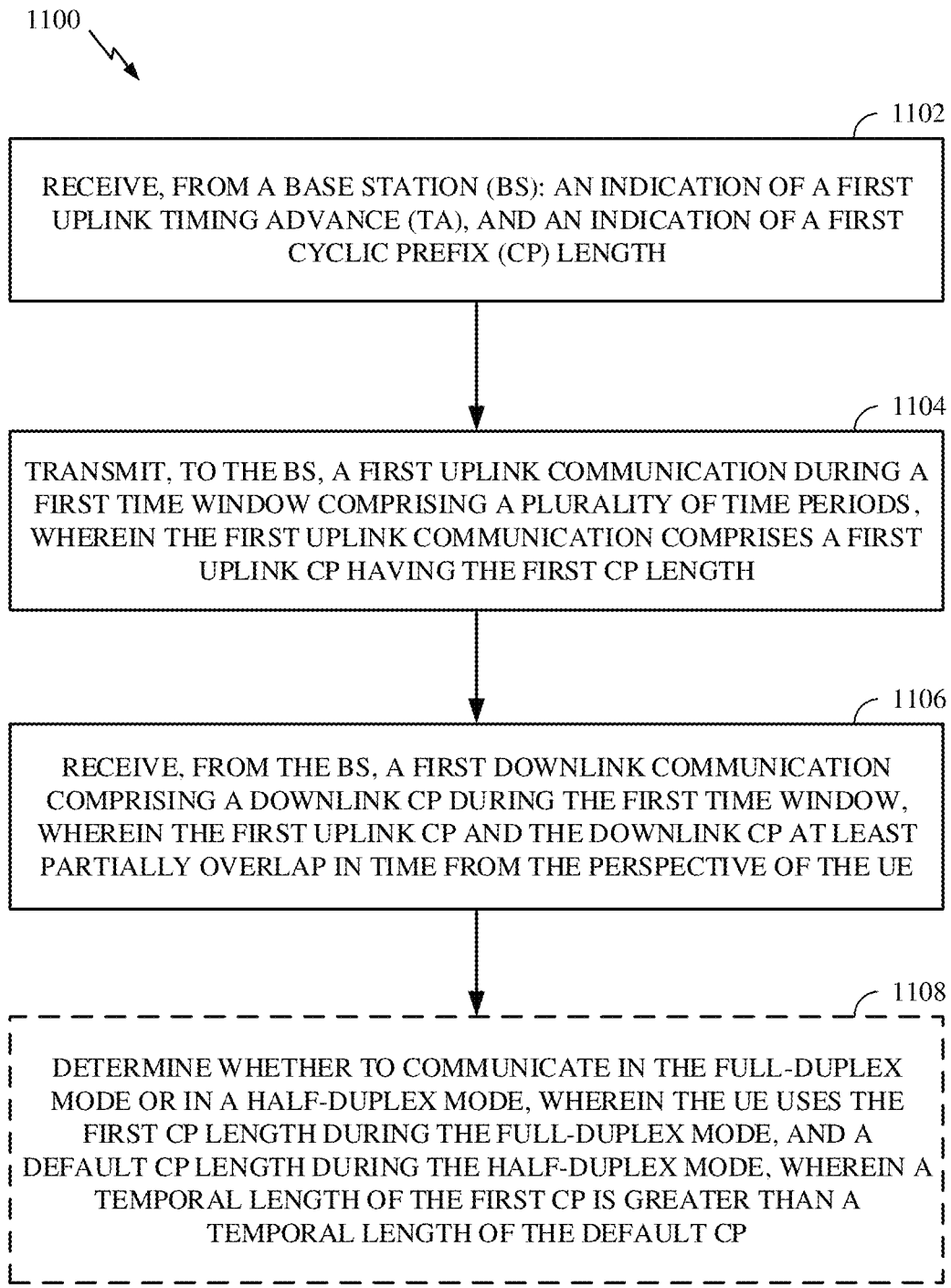
FIG. 11 is a flow diagram illustrating example operations for wireless communication, in accordance with certain aspects of the present disclosure.

FIG. 11 is a flow diagram illustrating example operations 1100 for wireless communication, in accordance with certain aspects of the present disclosure. The operations 1100 may be performed, for example, by a UE (e.g., such as the UE 120a in the wireless communication network 100). The operations 1100 may be implemented as software components that are executed and run on one or more processors (e.g., controller/processor 280 of FIG. 2). Further, the transmission and reception of signals by the UE in operations 1100 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1100 may begin, at a first block 1102, by receiving, from a base station (BS): an indication of a first uplink timing advance (TA), and an indication of a first cyclic prefix (CP) length. For example, the BS may determine the first CP length based on a TA determined by the BS for full duplex communication by the UE.

The operations 1100 may proceed, at a second block 1104, by transmitting, to the BS, a first uplink communication during a first time window comprising a plurality of time periods, wherein the first uplink communication comprises a first uplink CP having the first CP length.

The operations 1100 may proceed, at a third block 1106, by receiving, from the BS, a first downlink communication comprising a downlink CP during the first time window, wherein the first uplink CP and the downlink CP at least partially overlap in time from the perspective of the UE.

In some examples, the operations 1100 may optionally include a fourth block 1108, wherein the BS proceeds by determining whether to communicate in the full-duplex mode or in a half-duplex mode, wherein the UE uses the first CP length during the full-duplex mode, and a default CP length during the half-duplex mode, wherein a temporal length of the first CP is greater than a temporal length of the default CP. For example, an extended CP ability at the UE may be activated when the UE enters into a full duplex communication mode. The extended CP ability at the UE may be deactivated if the UE enters into a half-duplex communication mode.

In certain aspects, the first CP length is longer than a length of the downlink CP.

In certain aspects, a last time period in time of the plurality of time periods is a guard period where the first UE refrains from transmitting.

In certain aspects, the first time window has a first duration, wherein a second time window after and adjacent to the first time window has a second duration, wherein the first duration is greater than the second duration.

In certain aspects, receiving the indication of the first uplink TA and the indication of the first CP length further comprises receiving, via one or more of a radio resource control (RRC) message or a medium access control (MAC) control element (CE): a plurality of CP lengths including the first CP length; and a mapping between each of the plurality of CP lengths and a plurality of uplink TAs including the first uplink TA.

In certain aspects, the mapping comprises a one-to-one mapping between each of the plurality of CP lengths and a unique uplink TA of the plurality of uplink TAs.

In certain aspects, each of the plurality of CP lengths map to a subset of TAs of the plurality of uplink TAs, the plurality of uplink TAs comprising multiple subsets.

In certain aspects, receiving the indication of the first CP length further comprises receiving the first CP length via one of a radio resource control (RRC) or a medium access control (MAC) control element (CE).

In certain aspects, the indication of the first CP length comprises an integer configured to indicate an amount of time to add to a default CP length.

In certain aspects, the UE uses the first CP length for all uplink carriers used for communication with the BS.

In certain aspects, the UE uses the first CP length for all base stations in a same timing advance group as the BS.

In certain aspects, the operations 1100 further include determining whether the first uplink TA is greater than a threshold value, wherein transmitting the first uplink communication further comprises: transmitting the first uplink communication comprising the first uplink CP having the first CP length in response to a determination that the first uplink TA is greater than the threshold value; and transmitting the first uplink communication comprising the first uplink CP having a default CP length in response to a determination that the first uplink TA is less than the threshold value, wherein the default CP length is shorter than the first CP length.

Figure 12:
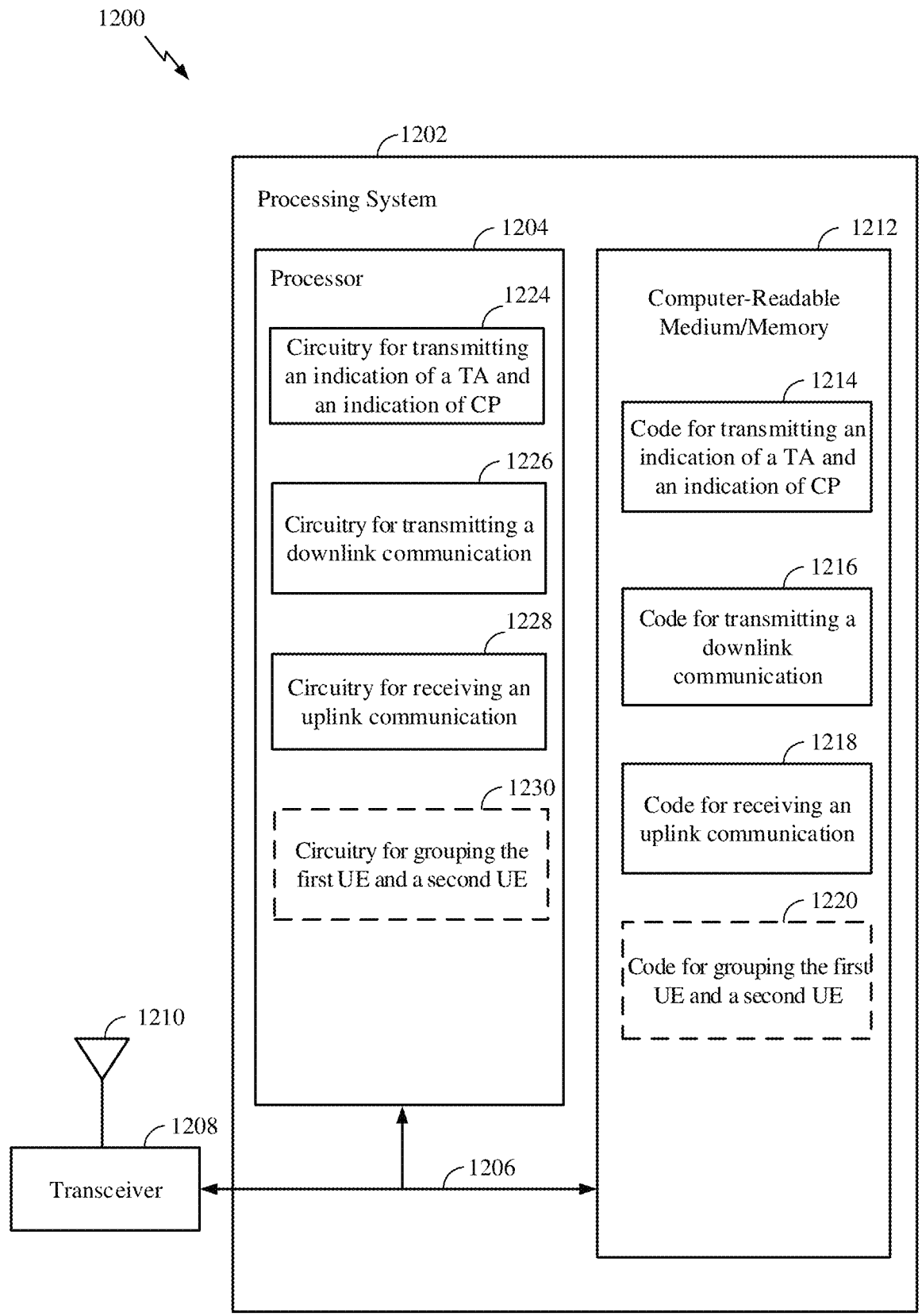
FIG. 12 is a block diagram illustrating a communications device that may include various components (e.g., corresponding to means-plus-function components) configured to perform operations for the techniques disclosed herein, such as the operations illustrated in FIG. 10.

FIG. 12 illustrates a communications device 1200 that may include various components (e.g., corresponding to means-plus-function components) configured to perform operations for the techniques disclosed herein, such as the operations illustrated in FIG. 10. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 10, or other operations for performing the various techniques discussed herein for time aligning uplink and downlink symbols in full duplex communication.

In certain aspects, computer-readable medium/memory 1212 stores code 1214 for transmitting, to a first user equipment (UE): an indication of a first uplink timing advance (TA) determined based on a first propagation delay between the BS and the first UE, and an indication of a first cyclic prefix (CP) length determined based on the first uplink TA; code 1216 for transmitting, to the first UE, a first downlink communication comprising a downlink CP, during a first time window comprising a plurality of time periods; code 1218 for receiving, from the first UE, a first uplink communication during the first time window, wherein the first uplink communication comprises a first uplink CP having the first CP length, and wherein the first uplink CP and the downlink CP at least partially overlap in time from, the perspective of the BS; and code 1220 for grouping the first UE and a second UE to transmit during a same time period of the plurality of time periods based on a determination that the calculated first CP length corresponds to both the first UE and the second UE.

In certain aspects, the processor 1204 has circuitry configured to implement the code stored in the computer-readable medium/memory 1212. The processor 1204 includes circuitry 1224 for transmitting, to a first user equipment (UE): an indication of a first uplink timing advance (TA) determined based on a first propagation delay between the BS and the first UE, and an indication of a first cyclic prefix (CP) length determined based on the first uplink TA; circuitry 1226 for transmitting, to the first UE, a first downlink communication comprising a downlink CP, during a first time window comprising a plurality of time periods; circuitry 1228 for receiving, from the first UE, a first uplink communication during the first time window, wherein the first uplink communication comprises a first uplink CP having the first CP length, and wherein the first uplink CP and the downlink CP at least partially overlap in time from, the perspective of the BS; and circuitry 1230 for grouping the first UE and a second UE to transmit during a same time period of the plurality of time periods based on a determination that the calculated first CP length corresponds to both the first UE and the second UE.

For example, means for transmitting (or means for outputting for transmission) may include a transmitter and/or an antenna(s) 234 or the BS 110a illustrated in FIG. 2 and/or circuitry 1224 for transmitting, to a first user equipment (UE): an indication of a first uplink timing advance (TA) determined based on a first propagation delay between the BS and the first UE, and an indication of a first cyclic prefix (CP) length determined based on the first uplink TA, and circuitry 1226 transmitting, to the first UE, a first downlink communication comprising a downlink CP, during a first time window comprising a plurality of time periods, of the communication device 1200 in FIG. 12.

Means for receiving (or means for obtaining) may include a receiver and/or an antenna(s) 234 of the BS 110a illustrated in FIG. 2 and/or circuitry 1228 for receiving, from the first UE, a first uplink communication during the first time window, wherein the first uplink communication comprises a first uplink CP having the first CP length, and wherein the first uplink CP and the downlink CP at least partially overlap in time from, the perspective of the BS, of the communication device 1200 in FIG. 12.

Means for communicating may include a transmitter, a receiver or both. Means for generating, means for performing, means for determining, means for taking action, means for determining, means for coordinating may include a processing system, which may include one or more processors, such as the transmit processor 220, the TX MIMO processor 230, the receive processor 238, and/or the controller/processor 240 of the BS 110a illustrated in FIG. 2 and/or the processing system 1202 of the communication device 1200 in FIG. 12.

Figure 13:
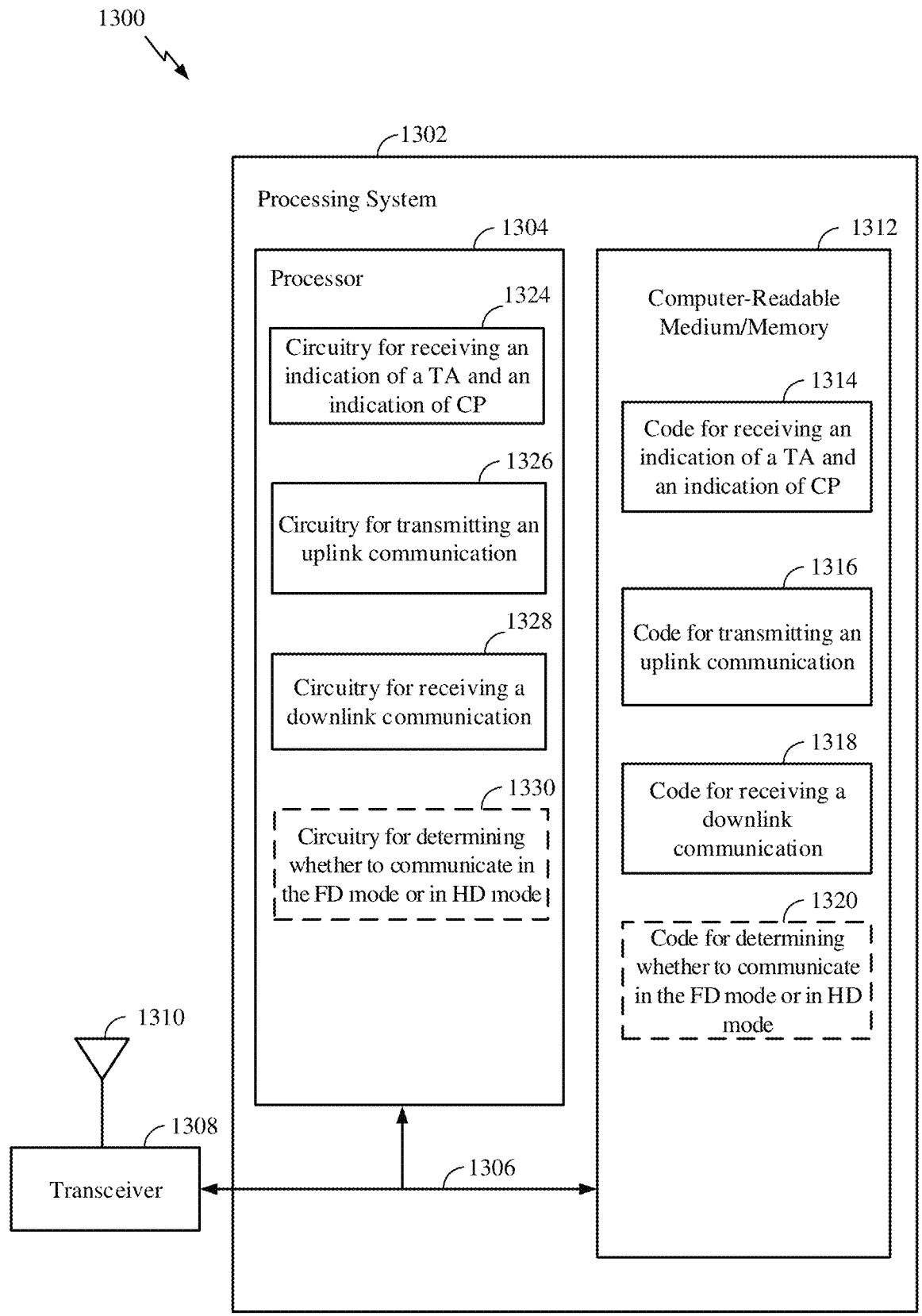
FIG. 13 illustrates a communications device that may include various components (e.g., corresponding to means-plus-function components) configured to perform operations for the techniques disclosed herein, such as the operations illustrated in FIG. 11.

FIG. 13 illustrates a communications device 1300 that may include various components (e.g., corresponding to means-plus-function components) configured to perform operations for the techniques disclosed herein, such as the operations illustrated in FIG. 11. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 11, or other operations for performing the various techniques discussed herein for time aligning uplink and downlink symbols in full duplex communication.

In certain aspects, computer-readable medium/memory 1312 stores code 1314 for receiving, from a base station (BS): an indication of a first uplink timing advance (TA), and an indication of a first cyclic prefix (CP) length; code 1316 for transmitting, to the BS, a first uplink communication during a first time window comprising a plurality of time periods, wherein the first uplink communication comprises a first uplink CP having the first CP length; code 1318 for receiving, from the BS, a first downlink communication comprising a downlink CP during the first time window, wherein the first uplink CP and the downlink CP at least partially overlap in time from the perspective of the UE; and code 1320 for determining whether to communicate in the full-duplex mode or in a half-duplex mode, wherein the UE uses the first CP length during the full-duplex mode, and a default CP length during the half-duplex mode, wherein a temporal length of the first CP is greater than a temporal length of the default CP.

In certain aspects, the processor 1304 has circuitry configured to implement the code stored in the computer-readable medium/memory 1312. The processor 1304 includes circuitry 1324 for receiving, from a base station (BS): an indication of a first uplink timing advance (TA), and an indication of a first cyclic prefix (CP) length; circuitry 1326 for transmitting, to the BS, a first uplink communication during a first time window comprising a plurality of time periods, wherein the first uplink communication comprises a first uplink CP having the first CP length; circuitry 1328 for receiving, from the BS, a first downlink communication comprising a downlink CP during the first time window, wherein the first uplink CP and the downlink CP at least partially overlap in time from the perspective of the UE; and circuitry 1330 for determining whether to communicate in the full-duplex mode or in a half-duplex mode, wherein the UE uses the first CP length during the full-duplex mode, and a default CP length during the half-duplex mode, wherein a temporal length of the first CP is greater than a temporal length of the default CP.

For example, means for transmitting (or means for outputting for transmission) may include a transmitter unit 254 and/or antenna(s) 252 of the UE 120a illustrated in FIG. 2 and/or circuitry 1326 for transmitting, to the BS, a first uplink communication during a first time window comprising a plurality of time periods, wherein the first uplink communication comprises a first uplink CP having the first CP length, of the communication device 1300 in FIG. 13.

Means for receiving (or means for obtaining) may include a receiver and/or an antenna(s) 234 of the UE 120a illustrated in FIG. 2 and/or circuitry 1324 for receiving, from a base station (BS): an indication of a first uplink timing advance (TA), and an indication of a first cyclic prefix (CP) length, and circuitry 1328 for receiving, from the BS, a first downlink communication comprising a downlink CP during the first time window, wherein the first uplink CP and the downlink CP at least partially overlap in time from the perspective of the UE, of the communication device 1300 in FIG. 13.

Means for communicating may include a transmitter, a receiver or both. Means for generating, means for performing, means for determining, means for taking action, means for determining, means for coordinating may include a processing system, which may include one or more processors, such as the receive processor 258, the transmit processor 264, the TX MIMO processor 266, and/or the controller/processor 280 of the UE 120a illustrated in FIG. 2 and/or the processing system 1302 of the communication device 1300 in FIG. 13.

Example Aspects

Implementation examples are described in the following numbered clauses:

1. A method for full-duplex mode wireless communication by a base station (BS), the method comprising: transmitting, to a first user equipment (UE): an indication of a first uplink timing advance (TA) determined based on a first propagation delay between the BS and the first UE, and an indication of a first cyclic prefix (CP) length determined based on the first uplink TA; transmitting, to the first UE, a first downlink communication comprising a downlink CP, during a first time window comprising a plurality of time periods; and receiving, from the first UE, a first uplink communication during the first time window, wherein the first uplink communication comprises a first uplink CP having the first CP length, and wherein the first uplink CP and the downlink CP at least partially overlap in time from, a perspective of the BS.

2. The method of aspect 1, wherein the first CP length is longer than a length of the downlink CP.

3. The method of any of aspects 1 and 2, wherein a last time period in time of the plurality of time periods is a guard period where the first UE refrains from transmitting.

4. The method of any of aspects 1-3, wherein the first time window has a first duration, wherein a second time window after and adjacent to the first time window has a second duration, wherein the first duration is greater than the second duration.

5. The method of any of aspects 1-4, wherein the first CP length is calculated based on the first uplink TA and a default CP length, and wherein a length of the downlink CP is equal to the default CP length.

6. The method of any of aspects 1-5, wherein the first uplink TA is calculated to obtain: (i) the at least partial overlap in time, from a perspective of the first UE, of the first uplink CP and the downlink CP, and (ii) an at least partial overlap in time, from the perspective of the BS, of the first uplink CP and a second uplink CP transmitted by a second UE.

7. The method of any of aspects 1-6, wherein transmitting the indication of the first uplink TA and the indication of the first CP length further comprises transmitting, to the first UE, via one or more of a radio resource control (RRC) message or a medium access control (MAC) control element (CE): a plurality of CP lengths including the first CP length; and a mapping between each of the plurality of CP lengths and a plurality of uplink TAs including the first uplink TA.

8. The method of aspect 7, wherein the mapping comprises a one-to-one mapping between each of the plurality of CP lengths and a unique uplink TA of the plurality of uplink TAs.

9. The method of aspect 7, wherein each of the plurality of CP lengths map to a subset of TAs of the plurality of uplink TAs, the plurality of uplink TAs comprising multiple subsets.

10. The method of any of aspects 1-7, wherein transmitting the indication of the first CP length further comprises transmitting the first CP length via one of a radio resource control (RRC) or a medium access control (MAC) control element (CE).

11. The method of any of aspects 1-7 and 10, wherein the indication of the first CP length comprises an integer configured to indicate an amount of time to add to a default CP length.

12. The method of any of aspects 1-7, 10 and 11, further comprising transmitting an indication of the first CP length to a second UE scheduled to transmit in a same time period of the plurality of time periods as used for the first uplink communication.

13. The method of any of aspects 1-7 and 10-12, further comprising grouping the first UE and a second UE to transmit during a same time period of the plurality of time periods based on a determination that the calculated first CP length corresponds to both the first UE and the second UE.

14. A method for full-duplex mode wireless communication by a user equipment (UE), the method comprising: receiving, from a base station (BS): an indication of a first uplink timing advance (TA), and an indication of a first cyclic prefix (CP) length determined based on the first uplink TA; transmitting, to the BS, a first uplink communication during a first time window comprising a plurality of time periods, wherein the first uplink communication comprises a first uplink CP having the first CP length; and receiving, from the BS, a first downlink communication comprising a downlink CP during the first time window, wherein the first uplink CP and the downlink CP at least partially overlap in time from a perspective of the UE.

15. The method of aspect 14, wherein the first CP length is longer than a length of the downlink CP.

16. The method of any of aspects 14 and 15, wherein a last time period in time of the plurality of time periods is a guard period where the first UE refrains from transmitting.

17. The method of any of aspects 14-16, wherein the first time window has a first duration, wherein a second time window after and adjacent to the first time window has a second duration, wherein the first duration is greater than the second duration.

18. The method of any of aspects 14-17, wherein receiving the indication of the first uplink TA and the indication of the first CP length further comprises receiving, via one or more of a radio resource control (RRC) message or a medium access control (MAC) control element (CE): a plurality of CP lengths including the first CP length; and a mapping between each of the plurality of CP lengths and a plurality of uplink TAs including the first uplink TA.

19. The method of aspect 18, wherein the mapping comprises a one-to-one mapping between each of the plurality of CP lengths and a unique uplink TA of the plurality of uplink TAs.

20. The method of aspect 18, wherein each of the plurality of CP lengths map to a subset of TAs of the plurality of uplink TAs, the plurality of uplink TAs comprising multiple subsets.

21. The method any of aspects 14-18, wherein receiving the indication of the first CP length further comprises receiving the first CP length via one of a radio resource control (RRC) or a medium access control (MAC) control element (CE).

22. The method of any of aspects 14-18 and 21, wherein the indication of the first CP length comprises an integer configured to indicate an amount of time to add to a default CP length.

23. The method of any of aspects 14-18 and 22, wherein the UE uses the first CP length for all uplink carriers used for communication with the BS.

24. The method of any of aspects 14-18, 22, and 23, wherein the UE uses the first CP length for all base stations in a same timing advance group as the BS.

25. The method of any of aspects 14-16 and 22-24, further comprising determining whether to communicate in the full-duplex mode or in a half-duplex mode, wherein the UE uses the first CP length during the full-duplex mode, and a default CP length during the half-duplex mode, wherein a temporal length of the first CP is greater than a temporal length of the default CP.

26. The method of any of aspects 14-16 and 22-25, further comprising determining whether the first uplink TA is greater than a threshold value, wherein transmitting the first uplink communication further comprises: transmitting the first uplink communication comprising the first uplink CP having the first CP length in response to a determination that the first uplink TA is greater than the threshold value; and transmitting the first uplink communication comprising the first uplink CP having a default CP length in response to a determination that the first uplink TA is less than the threshold value, wherein the default CP length is shorter than the first CP length.

27. A base station (BS) configured for full-duplex communication, the BS comprising: a memory; and a processor coupled to the memory, the memory and the processor configured to: transmit, to a first user equipment (UE): an indication of a first uplink timing advance (TA) determined based on a first propagation delay between the BS and the first UE, and an indication of a first cyclic prefix (CP) length determined based on the first uplink TA; transmit, to the first UE, a first downlink communication comprising a downlink CP, during a first time window comprising a plurality of time periods; and receive, from the first UE, a first uplink communication during the first time window, wherein the first uplink communication comprises a first uplink CP having the first CP length, and wherein the first uplink CP and the downlink CP at least partially overlap in time from, a perspective of the BS.

28. The BS of aspect 27, wherein the memory and the processor, being configured to transmit the indication of the first uplink TA and the indication of the first CP length, are further configured to transmit, to the first UE, via one or more of a radio resource control (RRC) message or a medium access control (MAC) control element (CE): a plurality of CP lengths including the first CP length; and a mapping between each of the plurality of CP lengths and a plurality of uplink TAs including the first uplink TA.

29. The BS of any of aspects 27 and 28, wherein the mapping comprises a one-to-one mapping between each of the plurality of CP lengths and a unique uplink TA of the plurality of uplink TAs.

30. A user equipment (UE) configured for full-duplex communication, the UE comprising: a memory; and a processor coupled to the memory, the memory and the processor configured to: receive, from a base station (BS): an indication of a first uplink timing advance (TA), and an indication of a first cyclic prefix (CP) length determined based on the first uplink TA; transmit, to the BS, a first uplink communication during a first time window comprising a plurality of time periods, wherein the first uplink communication comprises a first uplink CP having the first CP length; and receive, from the BS, a first downlink communication comprising a downlink CP during the first time window, wherein the first uplink CP and the downlink CP at least partially overlap in time from a perspective of the UE.

31. A base station (BS) for full-duplex mode wireless communication, the BS comprising: means for transmitting, to a first user equipment (UE): an indication of a first uplink timing advance (TA) determined based on a first propagation delay between the BS and the first UE, and an indication of a first cyclic prefix (CP) length determined based on the first uplink TA; means for transmitting, to the first UE, a first downlink communication comprising a downlink CP, during a first time window comprising a plurality of time periods; and means for receiving, from the first UE, a first uplink communication during the first time window, wherein the first uplink communication comprises a first uplink CP having the first CP length, and wherein the first uplink CP and the downlink CP at least partially overlap in time from, a perspective of the BS.

32. A user equipment (UE) for full-duplex mode wireless communication, the UE comprising: means for receiving, from a base station (BS): an indication of a first uplink timing advance (TA), and an indication of a first cyclic prefix (CP) length determined based on the first uplink TA; means for transmitting, to the BS, a first uplink communication during a first time window comprising a plurality of time periods, wherein the first uplink communication comprises a first uplink CP having the first CP length; and means for receiving, from the BS, a first downlink communication comprising a downlink CP during the first time window, wherein the first uplink CP and the downlink CP at least partially overlap in time from a perspective of the UE.

33. A non-transitory computer-readable medium having instructions stored thereon that, when executed by a base station (BS), cause the BS to perform operations for full-duplex communication, the operations comprising: transmitting, to a first user equipment (UE): an indication of a first uplink timing advance (TA) determined based on a first propagation delay between the BS and the first UE, and an indication of a first cyclic prefix (CP) length determined based on the first uplink TA; transmitting, to the first UE, a first downlink communication comprising a downlink CP, during a first time window comprising a plurality of time periods; and receiving, from the first UE, a first uplink communication during the first time window, wherein the first uplink communication comprises a first uplink CP having the first CP length, and wherein the first uplink CP and the downlink CP at least partially overlap in time from, a perspective of the BS.

34. A non-transitory computer-readable medium having instructions stored thereon that, when executed by a user equipment (UE), cause the UE to perform operations for full-duplex communication, the operations comprising: receiving, from a base station (BS): an indication of a first uplink timing advance (TA), and an indication of a first cyclic prefix (CP) length determined based on the first uplink TA; transmitting, to the BS, a first uplink communication during a first time window comprising a plurality of time periods, wherein the first uplink communication comprises a first uplink CP having the first CP length; and receiving, from the BS, a first downlink communication comprising a downlink CP during the first time window, wherein the first uplink CP and the downlink CP at least partially overlap in time from a perspective of the UE.

35. An apparatus comprising means for performing the method of any of aspects 1-13.

36. An apparatus comprising means for performing the method of any of aspects 14-26.

37. An apparatus comprising at least one processor and a memory coupled to the at least one processor, the memory comprising code executable by the at least one processor to cause the apparatus to perform the method of any of aspects 1-13.

38. An apparatus comprising at least one processor and a memory coupled to the at least one processor, the memory comprising code executable by the at least one processor to cause the apparatus to perform the method of any of aspects 14-26.

39. A computer readable medium storing computer executable code thereon for wireless communications that, when executed by at least one processor, cause an apparatus to perform the method of any of aspects 1-13.

40. A computer readable medium storing computer executable code thereon for wireless communications that, when executed by at least one processor, cause an apparatus to perform the method of any of aspects 14-26.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 10 and 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. A method for full-duplex mode wireless communication by a base station (BS), the method comprising:
    transmitting, to a first user equipment (UE):
        an indication of a first uplink timing advance (TA) determined based on a first propagation delay between the BS and the first UE, and
        an indication of a first cyclic prefix (CP) length determined based on the first uplink TA;
    transmitting, to the first UE, a first downlink communication comprising a downlink CP, during a first time window comprising a plurality of time periods; and
    receiving, from the first UE, a first uplink communication during the first time window, wherein the first uplink communication comprises a first uplink CP having the first CP length, and wherein the first uplink CP and the downlink CP at least partially overlap in time from, a perspective of one or more of the BS or the first UE.

2. The method of claim 1, wherein the first CP length is longer than a length of the downlink CP.

3. The method of claim 1, wherein a last time period in time of the plurality of time periods is a guard period where the first UE refrains from transmitting.

4. The method of claim 1, wherein the first time window has a first duration, wherein a second time window after and adjacent to the first time window has a second duration, wherein the first duration is greater than the second duration.

5. The method of claim 1, wherein the first CP length is calculated based on the first uplink TA and a default CP length, and wherein a length of the downlink CP is equal to the default CP length.

6. The method of claim 1, wherein the first uplink TA is calculated to obtain: (i) the at least partial overlap in time, from a perspective of the first UE, of the first uplink CP and the downlink CP, and (ii) an at least partial overlap in time, from the perspective of the BS, of the first uplink CP and a second uplink CP transmitted by a second UE.

7. The method of claim 1, wherein transmitting the indication of the first uplink TA and the indication of the first CP length further comprises transmitting, to the first UE, via one or more of a radio resource control (RRC) message or a medium access control (MAC) control element (CE):
 a plurality of CP lengths including the first CP length; and
 a mapping between each of the plurality of CP lengths and a plurality of uplink TAs including the first uplink TA.

8. The method of claim 7, wherein the mapping comprises a one-to-one mapping between each of the plurality of CP lengths and a unique uplink TA of the plurality of uplink TAs.

9. The method of claim 7, wherein each of the plurality of CP lengths map to a subset of TAs of the plurality of uplink TAs, the plurality of uplink TAs comprising multiple subsets.

10. The method of claim 1, wherein transmitting the indication of the first CP length further comprises transmitting the first CP length via one of a radio resource control (RRC) or a medium access control (MAC) control element (CE).

11. The method of claim 10, wherein the indication of the first CP length comprises an integer configured to indicate an amount of time to add to a default CP length.

12. The method of claim 1, further comprising transmitting an indication of the first CP length to a second UE scheduled to transmit in a same time period of the plurality of time periods as used for the first uplink communication.

13. The method of claim 1, further comprising grouping the first UE and a second UE to transmit during a same time period of the plurality of time periods based on a determination that the calculated first CP length corresponds to both the first UE and the second UE.

14. A method for full-duplex mode wireless communication by a user equipment (UE), the method comprising:
 receiving, from a base station (BS):
  an indication of a first uplink timing advance (TA), and
  an indication of a first cyclic prefix (CP) length determined based on the first uplink TA;
 transmitting, to the BS, a first uplink communication during a first time window comprising a plurality of time periods, wherein the first uplink communication comprises a first uplink CP having the first CP length; and
 receiving, from the BS, a first downlink communication comprising a downlink CP during the first time window, wherein the first uplink CP and the downlink CP at least partially overlap in time from, a perspective of one or more of the UE or the BS.

15. The method of claim 14, wherein the first CP length is longer than a length of the downlink CP.

16. The method of claim 14, wherein a last time period in time of the plurality of time periods is a guard period where the first UE refrains from transmitting.

17. The method of claim 14, wherein the first time window has a first duration, wherein a second time window after and adjacent to the first time window has a second duration, wherein the first duration is greater than the second duration.

18. The method of claim 14, wherein receiving the indication of the first uplink TA and the indication of the first CP length further comprises receiving, via one or more of a radio resource control (RRC) message or a medium access control (MAC) control element (CE):
 a plurality of CP lengths including the first CP length; and
 a mapping between each of the plurality of CP lengths and a plurality of uplink TAs including the first uplink TA.

19. The method of claim 18, wherein the mapping comprises a one-to-one mapping between each of the plurality of CP lengths and a unique uplink TA of the plurality of uplink TAs.

20. The method of claim 18, wherein each of the plurality of CP lengths map to a subset of TAs of the plurality of uplink TAs, the plurality of uplink TAs comprising multiple subsets.

21. The method of claim 14, wherein receiving the indication of the first CP length further comprises receiving the first CP length via one of a radio resource control (RRC) or a medium access control (MAC) control element (CE).

22. The method of claim 21, wherein the indication of the first CP length comprises an integer configured to indicate an amount of time to add to a default CP length.

23. The method of claim 14, wherein the UE uses the first CP length for all uplink carriers used for communication with the BS.

24. The method of claim 14, wherein the UE uses the first CP length for all base stations in a same timing advance group as the BS.

25. The method of claim 14, further comprising determining whether to communicate in the full-duplex mode or in a half-duplex mode, wherein the UE uses the first CP length during the full-duplex mode, and a default CP length during the half-duplex mode, wherein a temporal length of the first CP is greater than a temporal length of the default CP.

26. The method of claim 14, further comprising determining whether the first uplink TA is greater than a threshold value, wherein transmitting the first uplink communication further comprises:
 transmitting the first uplink communication comprising the first uplink CP having the first CP length in response to a determination that the first uplink TA is greater than the threshold value; and
 transmitting the first uplink communication comprising the first uplink CP having a default CP length in response to a determination that the first uplink TA is less than the threshold value, wherein the default CP length is shorter than the first CP length.

27. A base station (BS) configured for full-duplex communication, the BS comprising:
 a memory; and
 a processor coupled to the memory, the memory and the processor configured to:
  transmit, to a first user equipment (UE):
   an indication of a first uplink timing advance (TA) determined based on a first propagation delay between the BS and the first UE, and
   an indication of a first cyclic prefix (CP) length determined based on the first uplink TA;
  transmit, to the first UE, a first downlink communication comprising a downlink CP, during a first time window comprising a plurality of time periods; and receive, from the first UE, a first uplink communication during the first time window, wherein the first uplink communication comprises a first uplink CP having the first CP length, and wherein the first uplink CP and the downlink CP at least partially overlap in time from a perspective of one or more of the the BS or the first UE.

28. The BS of claim 27, wherein the memory and the processor, being configured to transmit the indication of the first uplink TA and the indication of the first CP length, are further configured to transmit, to the first UE, via one or more of a radio resource control (RRC) message or a medium access control (MAC) control element (CE):
  a plurality of CP lengths including the first CP length; and
  a mapping between each of the plurality of CP lengths and a plurality of uplink TAs including the first uplink TA.

29. The BS of claim 28, wherein the mapping comprises a one-to-one mapping between each of the plurality of CP lengths and a unique uplink TA of the plurality of uplink TAs.

30. A user equipment (UE) configured for full-duplex communication, the UE comprising:
  a memory; and
  a processor coupled to the memory, the memory and the processor configured to:
    receive, from a base station (BS):
      an indication of a first uplink timing advance (TA), and
      an indication of a first cyclic prefix (CP) length determined based on the first uplink TA;
    transmit, to the BS, a first uplink communication during a first time window comprising a plurality of time periods, wherein the first uplink communication comprises a first uplink CP having the first CP length; and
    receive, from the BS, a first downlink communication comprising a downlink CP during the first time window, wherein the first uplink CP and the downlink CP at least partially overlap in time from a perspective of one or more of the BS or the first UE.

* * * * *